US011716783B2

(12) United States Patent
Sharma et al.

(10) Patent No.: US 11,716,783 B2
(45) Date of Patent: *Aug. 1, 2023

(54) METHOD AND USER EQUIPMENT FOR HANDLING USER PLANE IN DUAL CONNECTIVITY IN WIRELESS COMMUNICATION SYSTEM

(71) Applicant: Samsung Electronics Co., Ltd., Suwon-si (KR)

(72) Inventors: Neha Sharma, Bangalore (IN); Mangesh Abhimanyu Ingale, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

This patent is subject to a terminal disclaimer.

(21) Appl. No.: 17/334,942

(22) Filed: May 31, 2021

(65) Prior Publication Data

US 2021/0298120 A1    Sep. 23, 2021

Related U.S. Application Data

(63) Continuation of application No. 16/652,362, filed as application No. PCT/KR2018/011657 on Oct. 1, 2018, now Pat. No. 11,026,291.

(30) Foreign Application Priority Data

Sep. 29, 2017 (IN) .............................. 201741034761
Sep. 20, 2018 (IN) .............................. 201741034761

(51) Int. Cl.
  *H04W 76/27* (2018.01)
  *H04W 76/19* (2018.01)
  (Continued)

(52) U.S. Cl.
  CPC ......... *H04W 80/02* (2013.01); *H04W 12/033* (2021.01); *H04W 12/04* (2013.01); *H04W 76/15* (2018.02); *H04W 76/27* (2018.02)

(58) Field of Classification Search
  None
  See application file for complete search history.

(56) References Cited

U.S. PATENT DOCUMENTS 10,512,116 B2    12/2019 Chang et al.
10,834,771 B2 *  11/2020 Sharma ............... H04W 12/041
(Continued)

FOREIGN PATENT DOCUMENTS

CN    104955064 A    9/2015
CN    105684491 A    6/2016
(Continued)

OTHER PUBLICATIONS

Intel Corporation, "RRC Connection Reconfiguration for MR-DC and NR-NR DC", 3GPP TSG-RAN WG2 Meeting #99, Aug. 21-25, 2017, R2-1708831, 7 pages.
(Continued)

*Primary Examiner* — Ajit Patel

(57) ABSTRACT

Embodiments herein provide a method for handling a user plane by a UE configured for dual connectivity operation. The method includes receiving a RRC reconfiguration message including one or more Layer 2 indications and a Layer 2 configuration corresponding to one or more radio bearers from one of a MN and a SN involved in a dual connectivity operation of the UE. Further, the method includes performing, by the UE, one of: reestablishing of a RLC entity and a data recovery procedure for a PDCP entity corresponding to the radio bearer based on the one or more Layer 2 indications and the Layer 2 configuration received in the RRC reconfiguration message, and reestablishing of a RLC entity and reestablishing of a PDCP entity corresponding to (Continued)

the radio bearer based on the one or more Layer 2 indications and the Layer 2 configuration received in the RRC reconfiguration message.

19 Claims, 9 Drawing Sheets

(51) Int. Cl.
*H04W 80/02* (2009.01)
*H04W 76/15* (2018.01)
*H04W 12/04* (2021.01)
*H04W 12/033* (2021.01)

(56) References Cited

U.S. PATENT DOCUMENTS

| | | | |
|---|---|---|---|
| 10,863,513 | B2 | 12/2020 | Xiao et al. |
| 10,986,530 | B2* | 4/2021 | Hong ............ H04W 76/15 |
| 11,438,954 | B2* | 9/2022 | Palat ............ H04W 76/27 |
| 2014/0056243 | A1 | 2/2014 | Pelletier et al. |
| 2015/0181473 | A1 | 6/2015 | Horn et al. |
| 2016/0014647 | A1 | 1/2016 | Yi et al. |
| 2016/0021581 | A1 | 1/2016 | Deenoo et al. |
| 2016/0029245 | A1 | 1/2016 | Hong et al. |
| 2016/0044639 | A1 | 2/2016 | Yi et al. |
| 2016/0057687 | A1* | 2/2016 | Horn ............ H04W 28/10 370/331 |
| 2016/0135095 | A1 | 5/2016 | Wu |
| 2016/0212661 | A1 | 7/2016 | Basu Mallick et al. |
| 2016/0226632 | A1 | 8/2016 | Zhang et al. |
| 2016/0255675 | A1 | 9/2016 | Van Lieshout et al. |
| 2016/0277992 | A1 | 9/2016 | Cao |
| 2016/0309389 | A1 | 10/2016 | Laraqui et al. |
| 2016/0316508 | A1 | 10/2016 | Hong et al. |
| 2016/0366175 | A1 | 12/2016 | Basu Mallick et al. |
| 2017/0013668 | A1 | 1/2017 | Chang et al. |
| 2017/0111832 | A1 | 4/2017 | Wen et al. |
| 2017/0215225 | A1 | 7/2017 | Yi et al. |
| 2017/0230780 | A1 | 8/2017 | Chincholi et al. |
| 2017/0230873 | A1 | 8/2017 | Baek et al. |
| 2017/0374578 | A1 | 12/2017 | Selvaganapathy et al. |
| 2017/0374579 | A1 | 12/2017 | Wang et al. |
| 2018/0049091 | A1 | 2/2018 | Wang |
| 2018/0083688 | A1 | 3/2018 | Agiwal et al. |
| 2018/0092085 | A1* | 3/2018 | Shaheen ............ H04W 36/0022 |
| 2018/0352556 | A1 | 12/2018 | Loehr et al. |
| 2019/0097874 | A1 | 3/2019 | Zhou et al. |
| 2019/0132778 | A1 | 5/2019 | Park et al. |
| 2019/0159274 | A1* | 5/2019 | Hong ............ H04W 76/27 |
| 2019/0166646 | A1 | 5/2019 | Shih et al. |
| 2019/0215048 | A1 | 7/2019 | Cirik et al. |
| 2020/0267753 | A1 | 8/2020 | Adjakple et al. |

FOREIGN PATENT DOCUMENTS

| | | |
|---|---|---|
| CN | 105992288 A | 10/2016 |
| CN | 106063360 A | 10/2016 |
| CN | 106231637 A | 12/2016 |
| CN | 106304399 A | 1/2017 |
| CN | 106537882 A | 3/2017 |
| CN | 107018542 A | 8/2017 |
| EP | 3072351 B1 | 7/2017 |
| KR | 2015-0086171 A | 7/2015 |
| KR | 2016-0128400 A | 11/2016 |
| KR | 2017-0041658 A | 4/2017 |
| WO | 2015047051 A1 | 4/2015 |
| WO | 2016/122814 A1 | 8/2016 |
| WO | 2017/014802 A1 | 1/2017 |
| WO | 2017/135666 A1 | 8/2017 |

OTHER PUBLICATIONS

Huawei, HiSilicon, "DRB configuration and switch in dual connectivity", 3GPP TSG RAN WG2 Meeting #87, Aug. 22, 2014, R2-143343, 5 pages.
"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V0.2.1 (Aug. 2017), 43 pages.
Huawei (rapporteur), "Summary of [97bis#12][NR] Bearer type change (Huawei)", 3GPP TSG-RAN WG2 Meeting #98, May 15-19, 2017, R2-17005155, 27 pages.
Ericsson, "Bearer type switching in dual connectivity", 3GPP TSG-RAN WG2 NR#2, Jun. 27-29, 2017, Tdoc R2-1706572, 6 pages.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.3.0 (Jun. 2017), 745 pages.
Supplementary European Search Report dated May 7, 2020 in connection with European Patent Application No. 18 84 3561, 10 pages.
Supplementary European Search Report dated Sep. 16, 2020 in connection with European Patent Application No. 18 86 2035, 7 pages.
Office Action dated Nov. 25, 2020 in connection with Korean Patent Application No. 10-2020-7012731, 10 pages.
Notification of Transmittal of the International Search Report and the Written Opinion of the International Searching Authority, or the Declaration dated Nov. 22, 2018 in connection with International Patent Application No. PCT/KR2018/009274, 10 pages.
Notification of Transmittal of the International Search Report and the Written Opinion of the International Searching Authority, or the Declaration dated Nov. 20, 2018 in connection with International Patent Application No. PCT/KR2018/009275, 10 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.3.0 (Jun. 2017), 330 pages.
ZTE, CMCC, "Consideration on the bearer type harmonization", 3GPP TSG RAN WG2#NR AdHoc#2, Jun. 27-29, 2017, R2-1706980, 37 pages.
Huawei, HiSilicon, "Design for harmonized bearer type", 3GPP TSG-RAN WG2 Meeting Ad hoc, Jun. 27-29, 2017, R2-1707402, 5 pages.
Huawei, HiSilicon, "Discussion of procedural specification for bearer type change in DC", 3GPP TSG RAN WG2 Meeting #87bis, Oct. 6-10, 2014, R2-144124, 12 pages.
Samsung, "Inter-RAT Mobility for EN-DC", 3GPP TSG-RAN WG2#NR_AdHoc#2 Meeting, Jun. 27-29, 2017, R2-1707089, 4 pages.
Samsung, "Lossless PDCP version change between LTE and NR", 3GPP TSG-RAN WG2 Meeting #99, Aug. 21-25, 2017, R2-1709028, 4 pages.
Supplementary European Search Report dated May 18, 2020 in connection with European Patent Application No. 18 84 2954, 8 pages.
Huawei, HiSilicon, "PDCP SN Reconfiguration", 3GPP TSG-RAN WG2 Meeting #97bis, Apr. 3-7, 2017, R2-1702587, 6 pages.
Vivo, "Layer-2 behaviors of PDCP duplication activation deactivation", 3GPP TSG-RAN WG2 Meeting #99, Aug. 21-25, 2017, R2-1708508, 3 pages.
International Search Report dated Jan. 2, 2019 in connection with International Patent Application No. PCT/KR2018/011657, 3 pages.
Office Action dated Jun. 25, 2021 in connection with Chinese Patent Application No. 201880052072.7, 24 pages.
3GPP TS 36.300 v14.4.0 (Sep. 2017) Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14); 329 pages.
European Patent Office, "Communication pursuant to Article 94(3) EPC," dated Jun. 14, 2022, in connection with European Patent Application No. 18862035.5, 7 pages.

(56) References Cited

OTHER PUBLICATIONS

European Patent Office, "Communication pursuant to Article 94(3) EPC," dated Dec. 23, 2022, in connection with European Patent Application No. 18843561.4, 6 pages.

European Patent Office, "Communication under Rule 71(3) EPC," dated Jan. 23, 2023, in connection with European Patent Application No. 18862035.5, 72 pages.

China National Intellectual Property Office, "Notification of the First Office Action," dated Feb. 27, 2023, in connection with Chinese Patent Application No. 201880077365.0, 10 pages.

China National Intellectual Property Office, "Notification of the First Office Action," dated Feb. 15, 2023, in connection with Chinese Patent Application No. 201880052222.4, 42 pages.

United States Patent and Trademark Office, "Notice of Allowance," dated Feb. 1, 2023, in connection with U.S. Appl. No. 17/539,346, 11 pages.

\* cited by examiner

METHOD AND USER EQUIPMENT FOR HANDLING USER PLANE IN DUAL CONNECTIVITY IN WIRELESS COMMUNICATION SYSTEM

CROSS-REFERENCE TO RELATED APPLICATIONS

This application is a continuation of U.S. patent application Ser. No. 16/652,362 filed on Mar. 30, 2020, which is a 371 of International Application No. PCT/KR2018/011657 filed on Oct. 1, 2018, which claims priority to Indian Patent Application No. 201741034761 filed on Sep. 29, 2017 and Indian Patent Application No. 201741034761 filed on Sep. 20, 2018, the disclosures of which are herein incorporated by reference in their entirety.

BACKGROUND

1. Field

The present disclosure relates to a wireless communication system. More particularly it is related to a method for handling a user plane in a dual connectivity operation in a wireless communication system.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The principal object of the embodiments herein is to provide a method and system for handling user plane by a UE in a Multi-RAT Dual connectivity (MR-DC) operation in a wireless communication system.

Another object of the embodiments herein is to receive, by the UE, a Radio Resource Control (RRC) reconfiguration message including one or more Layer 2 indications and Layer 2 configuration corresponding to one or more radio bearers from one of a Master Node (MN) and a Secondary Node (SN) involved in a dual connectivity operation of the UE.

Another object of the embodiments herein is to reestablish of a RLC entity and a data recovery procedure for a Packet Data Convergence Protocol (PDCP) entity corresponding to the radio bearer based on the one or more Layer 2 indications and the Layer 2 configuration received in the RRC reconfiguration message.

Another object of the embodiments herein is to reestablish of a RLC entity and reestablishing of a PDCP entity corresponding to the radio bearer based on the one or more Layer 2 indications and the Layer 2 configuration received in the RRC reconfiguration message.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which.

DETAILED DESCRIPTION

Figure 1:
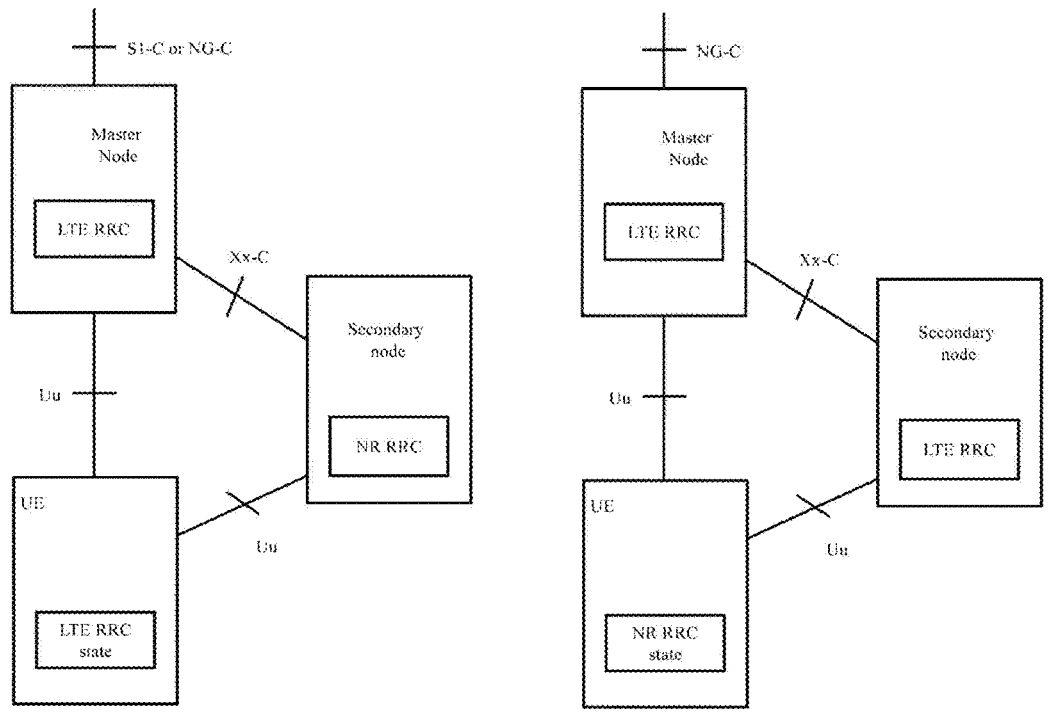
FIG. 1 illustrates a control plane architecture for dual connectivity of Long Term Evolution (LTE) and New Radio (NR), according to prior art.

Accordingly, embodiments herein provide a method for handling a user plane by a UE configured for a dual connectivity operation in a wireless communication system. The method includes receiving, by the UE, a RRC reconfiguration message including one or more Layer 2 indications and a Layer 2 configuration corresponding to one or more radio bearers from one of a MN and a SN involved in a dual connectivity operation of the UE. Further, the method includes performing, by the UE, one of: reestablishing of a RLC entity and a data recovery procedure for a PDCP entity corresponding to the radio bearer based on the one or more Layer 2 indications and the Layer 2 configuration received in the RRC reconfiguration message, and reestablishing of a RLC entity and reestablishing of a PDCP entity corresponding to the radio bearer based on the one or more Layer 2 indications and the Layer 2 configuration received in the RRC reconfiguration message.

In an embodiment, the RLC entity corresponding to the radio bearer is reestablished by performing one or more actions, if the received Layer 2 indication is a RLC reestablishment indicator.

In an embodiment, the RLC reestablishment indicator performs the one or more actions on one of the RLC entity, the corresponding logical channel linking it with a MAC entity associated with the MN node, and the RLC entity, the corresponding logical channel linking it with a MAC entity associated with the SN node.

In an embodiment, a data recovery procedure for a NR PDCP entity corresponding to the radio bearer is performed by one or more actions, if the received Layer 2 indication is a PDCP recovery indicator.

In an embodiment, a NR PDCP entity corresponding to the radio bearer is reestablished by performing one or more actions, if the received Layer 2 indication is a PDCP reestablishment indicator accompanied with a security key change indicator.

In an embodiment, the one or more Layer 2 indications and the Layer 2 configuration corresponding to one or more radio bearers included in the RRC reconfiguration message is at least one of RRC reconfiguration with a mobility control information used for a Primary Cell (PCell) change and a bearer type change, a RRC reconfiguration with mobility control information SCG used for a Primary SCell (PSCell) change and a bearer type change, a RRC reconfiguration with synchronization used for PCell or PSCell change and bearer type change, and a normal RRC reconfiguration for a bearer type change.

In an embodiment, the UE releases the RLC entity corresponding to the radio bearer during the bearer type change upon reception of the RLC reestablishment indicator, if the RLC entity is a New Radio (NR) RLC entity and performs retransmission of PDCP PDUs of a released NR RLC entity upon reception of the PDCP recovery indicator.

In an embodiment, the UE first reestablishes the RLC entity corresponding to the radio bearer and then release the RLC entity during the bearer type change upon reception of the RLC reestablishment indicator, if the RLC entity is a Long-Term Evolution (LTE) RLC entity and performs retransmission of PDCP PDUs of the released LTE RLC entity upon reception of the PDCP recovery indicator.

In an embodiment, the NR RLC entity is released, during bearer type change, by discarding at least one of one or more PDUs and Service Data Units (SDUs), and releasing the logical channel linking the NR RLC entity with the MAC entity.

In an embodiment, the LTE RLC entity is reestablished, during the bearer type change, by delivering at least one of one or more PDUs and SDUs in sequence to the PDCP for which acknowledgement is received, releasing the RLC entity, and releasing the logical channel linking the LTE RLC entity with the MAC entity.

In an embodiment, the retransmission of PDCP PDUs of the released RLC entity corresponding to the radio bearer comprises performing retransmission of PDCP Data PDUs previously submitted to the released RLC entity in ascending order of the associated COUNT values from the first PDCP Data PDU for which the successful delivery has not been confirmed by the RLC entity.

In an embodiment, the one or more actions, performed for reestablishing the NR PDCP entity and the RLC entity corresponding to the radio bearer, comprises reestablishing the NR PDCP entity based on the received PDCP reestablishment indicator, applying one of a master key and a secondary key based on the received security key change indicator, reestablishing the RLC entity based on the received RLC reestablishment indicator, regardless of the RLC entity is the LTE RLC entity or the NR RLC entity, and resetting the MAC entity associated with the radio bearer.

In an embodiment, the UE resets the MAC entity associated with one of the MN and the SN if the RRC reconfiguration message is one of a RRC reconfiguration with mobility control information used for a PCell Change and bearer type change, a RRC reconfiguration with mobility control information SCG used for Primary SCell (PSCell) Change and bearer type change, and RRC reconfiguration with sync used for PCell or PSCell Change and bearer type change.

In an embodiment, the UE does not reset the MAC entity associated with one of the MN and the SN if the normal RRC reconfiguration message includes Layer 2 configuration corresponding to one or more radio bearers comprising identifying one or more logical channels associated with the logical channel identity is either released or changed, and discarding sub-PDUs in the MAC PDU for identified invalid values of logical channel identity and discarding MAC PDUs for the logical channels identified as not linked to configured RLC entity.

In an embodiment, a Master Node (MN) and a Secondary Node (SN) are involved in the dual connectivity operation of the UE by receiving by the MN from the SN one of: a security key change indicator indicating the update of secondary key associated with the SN and the PDCP recovery indicator indicating PDCP data recovery required for one of a SCG bearer and Split terminated in the MN.

Accordingly, embodiments herein provide a UE for handling a user plane during a dual connectivity operation in a wireless communication system. The UE comprises a stack coordinator unit configured to receive a RRC reconfiguration message including one or more Layer 2 indications and Layer 2 configuration corresponding to one or more radio bearers from one of a MN and a SN involved in a dual connectivity operation of the UE. The stack coordinator unit configured to perform one of: reestablishing of a RLC entity and a data recovery procedure for a PDCP entity corresponding to the radio bearer based on the one or more Layer 2 indications and the Layer 2 configuration received in the RRC reconfiguration message, and reestablishing of a RLC entity and reestablishing of a PDCP entity corresponding to the radio bearer based on the one or more Layer 2 indications and the Layer 2 configuration received in the RRC reconfiguration message.

In an embodiment of the UE for handling a user plane during a dual connectivity operation in a wireless communication system, the RLC entity corresponding to the radio bearer is reestablished by performing one or more actions, if the received Layer 2 indication is a RLC reestablishment indicator.

In an embodiment of the UE for handling a user plane during a dual connectivity operation in a wireless communication system, the RLC reestablishment indicator performs the one or more actions on one of the RLC entity, the corresponding logical channel linking it with a MAC entity associated with the MN node, and the RLC entity, the corresponding logical channel linking it with a MAC entity associated with the SN node.

In an embodiment of the UE for handling a user plane during a dual connectivity operation in a wireless communication system, a data recovery procedure for a New Radio (NR) PDCP entity corresponding to the radio bearer is performed by one or more actions, if the received Layer 2 indication is a PDCP recovery indicator.

In an embodiment of the UE for handling a user plane during a dual connectivity operation in a wireless communication system, a NR PDCP entity corresponding to the radio bearer is reestablished by performing one or more actions, if the received Layer 2 indication is a PDCP reestablishment indicator accompanied with a security key change indicator.

In an embodiment of the UE for handling a user plane during a dual connectivity operation in a wireless communication system, the one or more Layer 2 indications and the Layer 2 configuration corresponding to one or more radio bearers included in the RRC reconfiguration message is at least one of RRC reconfiguration with a mobility control information used for a Primary Cell (PCell) change and a bearer type change, a RRC reconfiguration with mobility control information SCG used for a Primary SCell (PSCell) change and a bearer type change, a RRC reconfiguration with synchronization used for PCell or PSCell change and bearer type change, and a normal RRC reconfiguration for a bearer type change.

In an embodiment of the UE for handling a user plane during a dual connectivity operation in a wireless communication system, the UE releases the RLC entity corresponding to the radio bearer during the bearer type change upon reception of the RLC reestablishment indicator, if the RLC entity is a New Radio (NR) RLC entity and performs retransmission of PDCP Protocol Data Units (PDUs) of a released NR RLC entity upon reception of the PDCP recovery indicator.

In an embodiment of the UE for handling a user plane during a dual connectivity operation in a wireless communication system, the UE first reestablishes the RLC entity corresponding to the radio bearer and then release the RLC entity during the bearer type change upon reception of the RLC reestablishment indicator, if the RLC entity is a Long-Term Evolution (LTE) RLC entity and performs retransmission of PDCP PDUs of the released LTE RLC entity upon reception of the PDCP recovery indicator.

In an embodiment of the UE for handling a user plane during a dual connectivity operation in a wireless communication system, the NR RLC entity is released, during bearer type change, by: discarding at least one of one or more PDUs and Service Data Units (SDUs); and releasing the logical channel linking the NR RLC entity with the MAC entity.

In an embodiment of the UE for handling a user plane during a dual connectivity operation in a wireless communication system, the LTE RLC entity is reestablished, during the bearer type change, by: delivering at least one of one or more PDUs and SDUs in sequence to the PDCP for which acknowledgement is received; releasing the RLC entity; and releasing the logical channel linking the LTE RLC entity with the MAC entity.

In an embodiment of the UE for handling a user plane during a dual connectivity operation in a wireless communication system, the retransmission of PDCP PDUs of the released RLC entity corresponding to the radio bearer comprises: performing retransmission of PDCP Data PDUs previously submitted to the released RLC entity in ascending order of the associated COUNT values from the first PDCP Data PDU for which the successful delivery has not been confirmed by the RLC entity.

In an embodiment of the UE for handling a user plane during a dual connectivity operation in a wireless communication system, the one or more actions, performed for reestablishing the NR PDCP entity and the RLC entity corresponding to the radio bearer, comprises: reestablishing the NR PDCP entity based on the received PDCP reestablishment indicator; applying one of a master key and a secondary key based on the received security key change indicator; reestablishing the RLC entity based on the received RLC reestablishment indicator, regardless of the RLC entity is the LTE RLC entity or the NR RLC entity; and resetting the MAC entity associated with the radio bearer.

In an embodiment of the UE for handling a user plane during a dual connectivity operation in a wireless communication system, the UE resets the MAC entity associated with one of the MN and the SN if the RRC reconfiguration message is one of: RRC reconfiguration with mobility control information used for a Primary Cell (PCell) Change and bearer type change; RRC reconfiguration with mobility control information SCG used for Primary SCell (PSCell) Change and bearer type change; and RRC reconfiguration with sync used for PCell or PSCell Change and bearer type change.

In an embodiment of the UE for handling a user plane during a dual connectivity operation in a wireless communication system, the UE does not reset the MAC entity associated with one of the MN and the SN if the normal RRC reconfiguration message includes Layer 2 configuration corresponding to one or more radio bearers comprising: identifying one or more logical channels associated with the logical channel identity is either released or changed; and discarding sub-PDUs in the MAC PDU for identified invalid values of logical channel identity and discarding MAC PDUs for the logical channels identified as not linked to configured RLC entity.

Accordingly, embodiments herein provide A wireless network, comprising: a Master Node (MN) and a Secondary Node (SN) configured for dual connectivity operation of a User Equipment (UE), wherein the MN is configured for: receiving, from the SN, one of: a security key change indicator indicating an update of a secondary key associated with the SN and a Packet Data Convergence Protocol (PDCP) recovery indicator indicating a PDCP data recovery required for one of a secondary cell group (SCG) bearer and split terminated in the MN.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Prior to describing the embodiments in detail, the following definitions are described for better understanding of the embodiments of the present disclosure.

In the recent years, several broadband wireless technologies have been developed to meet the growing number of broadband subscribers and to provide better applications and services. The second generation wireless communication system has been developed to provide voice services while ensuring the mobility of users. The Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications.

The fifth generation wireless communication system will be implemented not only in lower frequency bands but also in higher frequency (mm Wave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fourth generation wireless communication systems, the UE in a connected state communicates with an Enhanced Node B (eNB). A radio protocol stack for communication between the UE and the eNB comprises of Packet Data Convergence Protocol (PDCP), Radio link control (RLC), a Medium Access Control (MAC) and Physical (PHY) sub layers. One or more data radio bearers (DRBs) are established between the UE and the eNB for exchanging user plane packets. Each DRB is associated with one PDCP entity and one or more RLC entities. Each DRB is associated with a logical channel in a MAC sub layer. There is one MAC entity in the UE for the eNB.

The main services and functions of the MAC sublayer include: mapping between logical channels and transport channels, Multiplexing/de-multiplexing of MAC SDUs belonging to one or different logical channels into/from transport blocks (TB) delivered to/from the physical layer on the transport channels, scheduling information reporting, error correction through HARQ, priority handling between the logical channels of one UE, priority handling between the UEs by means of dynamic scheduling, transport format selection and padding.

The main services and functions of the RLC sublayer include: transfer of upper layer PDUs, error correction through ARQ (only for Acknowledged Mode (AM) data transfer), concatenation, segmentation and reassembly of RLC SDUs (only for Un-acknowledgement Mode (UM) and AM data transfer), re-segmentation of the RLC data PDUs (only for the AM data transfer), reordering of the RLC data PDUs (only for the UM and AM data transfer), duplicate detection (only for the UM and AM data transfer), protocol error detection (only for the AM data transfer), the RLC SDU discard (only for the UM and AM data transfer), and RLC re-establishment.

Functions of the RLC sub layer are performed by the RLC entities. The RLC entity can be configured to perform the data transfer in one of the following three modes: Transparent Mode (TM), Unacknowledged Mode (UM), and Acknowledged Mode (AM). Consequently, the RLC entity is categorized as a TM RLC entity, an UM RLC entity and an AM RLC entity depending on the mode of data transfer that the RLC entity is configured to provide. The TM RLC entity is configured either as a transmitting TM RLC entity or a receiving TM RLC entity. The transmitting TM RLC entity receives RLC SDUs from an upper layer (i.e. PDCP) and sends RLC PDUs to its peer receiving the TM RLC entity via lower layers (i.e. MAC). The receiving TM RLC entity delivers the RLC SDUs to the upper layer (i.e. PDCP) and receives the RLC PDUs from its peer transmitting the TM RLC entity via the lower layers (i.e. MAC).

Further, the UM RLC entity is configured either as a transmitting UM RLC entity or a receiving UM RLC entity. The transmitting UM RLC entity receives the RLC SDUs from the upper layer and sends the RLC PDUs to its peer receiving UM RLC entity via the lower layers. The receiving UM RLC entity delivers the RLC SDUs to the upper layer and receives the RLC PDUs from its peer transmitting the UM RLC entity via the lower layers. The AM RLC entity consists of a transmitting side and a receiving side. The transmitting side of the AM RLC entity receives the RLC SDUs from the upper layer and sends the RLC PDUs to its peer AM RLC entity via the lower layers. The receiving side of the AM RLC entity delivers the RLC SDUs to the upper layer and receives the RLC PDUs from its peer AM RLC entity via the lower layers.

The main services and functions of the PDCP sublayer for the user plane include: header compression and decompression: ROHC only, transfer of user data, in-sequence delivery of the upper layer PDUs at PDCP re-establishment procedure for RLC AM, For split bearers in the DC (only support for the RLC AM): PDCP PDU routing for transmission and PDCP PDU reordering for reception, duplicate detection of the lower layer SDUs at the PDCP re-establishment procedure for the RLC AM, retransmission of the PDCP SDUs at handover and, for split bearers in DC, of PDCP PDUs at PDCP data-recovery procedure, for RLC AM, ciphering and deciphering, and timer-based SDU discard in an uplink (UL). Functions of the PDCP sub layer are performed by the PDCP entities. Each PDCP entity carries the data of one radio bearer. Due to the UE mobility, the UE may handover from one eNB to another eNB. In dual connectivity (DC) mode of operation due to UE mobility the UE may handover from one MeNB to another MeNB or SCG change from one SeNB to another SeNB. The eNB may support multiple cells and the UE may also handover from one cell to another cell of same eNB.

In the fourth generation wireless communication system like LTE, the handover between two enhanced nodeB (eNBs) or base station for AM data radio bearers (DRBs) is lossless.

After the handover, the user plane protocols for the DRBs configured with the RLC layer in the AM mode are handled as follows in a legacy system: a PDCP SN is maintained on a bearer basis; a source eNB informs the target eNB about the next DL PDCP SN to allocate to a packet which does not have a PDCP sequence number yet (either from the source eNB or from a serving gateway); For security synchronization, a Hyper Frame Number (HFN) is also maintained; the source eNB provides to the target one reference HFN for the UL and one for the DL i.e., HFN and corresponding SN; Security keys are refreshed; the UE sends PDCP status report to the target eNB if the PDCP is configured by the target eNB. The configuration to send status report is per bearer; the target eNB may send the PDCP status report to the UE and the UE does not need to wait to resume UL transmission; the UE re-transmits in the target eNB or the target cell, all uplink PDCP SDUs starting from the first PDCP SDU following the last consecutively confirmed PDCP SDU i.e., the oldest PDCP SDU that has not been acknowledged at the RLC in the source, excluding the PDCP SDUs of which the reception is acknowledged through the PDCP SN based reporting by the target eNB. The target eNB re-transmits and prioritizes all downlink PDCP SDUs forwarded by the source eNB (i.e., the target eNB should send data with the PDCP SNs from X2 before sending data from S1), with the exception of the PDCP SDUs of which the reception is acknowledged through the PDCP SN based reporting by the UE; the ROHC is reset; and the RLC/MAC is reset. The PDCP PDUs stored in the PDU reordering buffer are deciphered and decompressed and kept in the PDCP, associated with COUNT.

Alternately, after the handover the user plane protocols for DRBs configured with RLC in the UM mode are handled as follows in legacy system: the PDCP SN is reset; the HFN is reset; the security keys are refreshed; No PDCP status report is transmitted; No PDCP SDUs are retransmitted in the target eNB; The UE PDCP entity does not attempt to retransmit any PDCP SDU in the target cell for which transmission had been completed in the source cell. Instead UE PDCP entity starts the transmission with other PDCP SDUs; ROHC is reset; and RLC/MAC is reset. The user plane protocol of LTE from UE perspective is shown in FIG. 1.

In the fifth generation wireless communication system, the concept of QoS flows replacing the EPS bearer concept in the core network is introduced. This means the user plane between the gNB and the gateway is based on the QoS flow instead of the S1-U bearer in the LTE system. For the particular, there can be one or more QoS flows between the gNB and the data gateway depending on the characteristics of the application/service and the QoS handling of the traffic. The EPS bearer handles all the user packets mapped to the EPS bearer with the same QoS. Within the EPS bearer, there is no further differentiated handling of the user plane packets. The QoS flow concept of the 5G system overcomes this drawback of the EPS bearer concept of the LTE system. The packets mapped to the different QoS flows belonging to the UE traffic can be handled differently. To achieve the same differentiated handling in the LTE system, multiple EPS bearers with different QoS parameters need to be created. In the 5G system, all the different QoS flows of the UE are handled by the PDU session between the g/NB and the data gateway. The UE may have more than one PDU session depending on the number of the PDN connections. However, for one PDN connection one PDU session is created. At high level, the PDU session can be analogous with the EPS bearer in the LTE system.

However, on the radio interface, the 5G system has retained the DRB concept for user plane handling. This requires that the one or more QoS flows belonging to the PDU session of the UE is mapped to the DRB depending on the QoS requirement. The mapping of the QoS flow to the DRB is done in the RAN node i.e. the gNB within the new user plane protocol layer called Service Data Adaptation Protocol (SDAP) layer which is placed above the PDCP. The SDAP entities are located in the SDAP sublayer. Several SDAP entities may be defined for the UE. There is the SDAP entity configured per cell group for each individual PDU session. The SDAP entity in the SDAP sublayer performs mapping between the QoS flow and the data radio bearer for both the DL and the UL.

Multi-RAT Dual Connectivity (MR-DC) is a generalization of the Intra-E-UTRA Dual Connectivity (DC) described in 3GPP TS 36.300, where a multiple Rx/Tx UE may be configured to utilize radio resources provided by two distinct schedulers in two different nodes connected via non-ideal backhaul, one providing E-UTRA access and the other one providing NR access. One scheduler is located in the MN and the other in the SN. The MN and SN are connected via a network interface and at least the MN is connected to the core network.

As described in 3GPP TS 37.340, E-UTRAN supports MR-DC via E-UTRA-NR Dual Connectivity (EN-DC), in which a UE is connected to one eNB that acts as a Master Node (MN) and one gNB that acts as a Secondary Node (SN). The eNB is connected to the EPC and the gNB is connected to the eNB via the X2 interface.

NG-RAN supports NG-RAN E-UTRA-NR Dual Connectivity (NGEN-DC), in which a UE is connected to one eNB that acts as a MN and one gNB that acts as a SN. The eNB is connected to the 5GC and the gNB is connected to the eNB via the Xn interface.

NG-RAN supports NR-E-UTRA Dual Connectivity (NE-DC), in which a UE is connected to one gNB that acts as a MN and one eNB that acts as a SN. The gNB is connected to 5GC and the eNB is connected to the gNB via the Xn interface.

In MR-DC, the UE has a single RRC state, based on the MN RRC and a single C-plane connection towards the Core Network. For example in the FIG. 1, the Control plane architecture for MR-DC i.e. C-plane architecture for Dual Connectivity between LTE and NR. Each radio node has its own RRC entity (E-UTRA version if the node is an eNB or NR version if the node is a gNB) which can generate RRC PDUs to be sent to the UE. RRC PDUs generated by the SN can be transported via the MN to the UE. The MN always sends the initial SN RRC configuration via MCG SRB, but subsequent reconfigurations may be transported via MN or SN. When transporting RRC PDU from the SN, the MN does not modify the UE configuration provided by the SN.

Figure 2A:
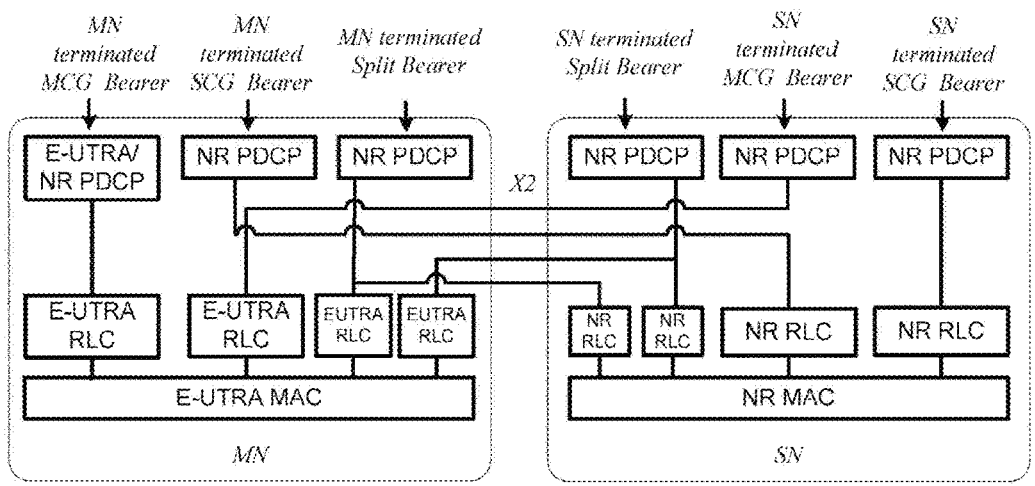
FIGS. 2A-2B illustrates various bearer types for dual connectivity, according to prior arts.
Figure 2B:
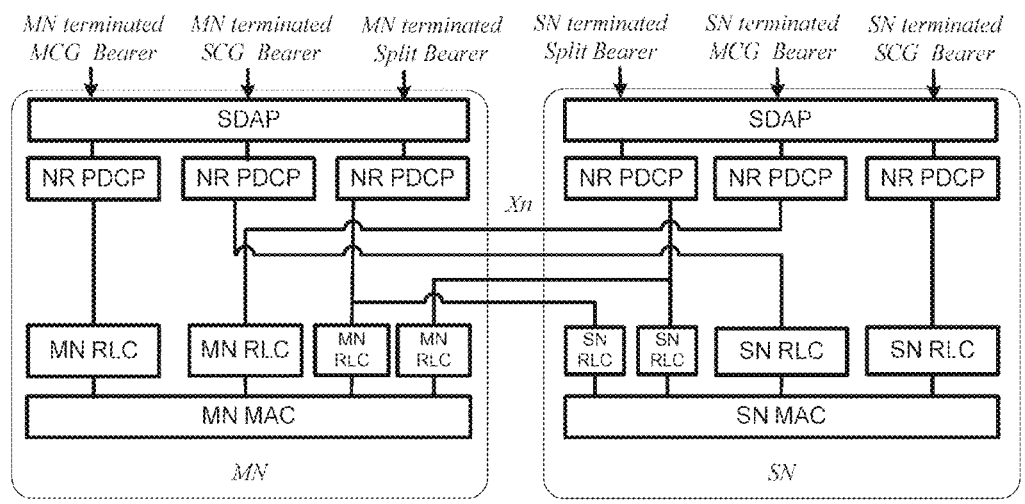

In MR-DC, the radio protocol architecture that a particular radio bearer uses depends on how the radio bearer is setup. Four bearer types exist: MCG bearer, MCG split bearer, SCG bearer and SCG split bearer. The MCG bearer can be configured with either LTE PDCP or NR PDCP while the MCG Split bearer, SCG Split bearer and SCG bearer is configured with NR PDCP. As both MCG split bearer and SCG split bearer uses NR-PDCP and both have lower layers in MN and SN, so these bearer types ideally does not have any difference and can be referred as split bearer. In MR-DC, from a UE perspective, three bearer types exist: MCG bearer, SCG bearer and split bearer. From a network perspective, each bearer (MCG, SCG and split bearer) can be terminated either in MN or in SN. Network side protocol termination options are shown in FIG. 2a for MR-DC with EPC (EN-DC) and in FIG. 2b for MR-DC with 5GC (NGEN-DC, NE-DC).

In LTE-DC bearer type change occurs either through HO or SN change as a result L2 entities are re-established and are reset. This is introduced to simplify the bearer type change procedure. This procedure impacts the data on other bearers also and cause interruption to user services.

The above information is presented as background information only to help the reader to understand the present invention. Applicants have made no determination and make no assertion as to whether any of the above might be applicable as Prior Art with regard to the present application.

The UE can be configured to operate in dual connectivity (DC) mode of operation wherein the UE maintains RRC connection with a serving cell from the master node (MN) and the UE can be configured with one or more serving cells from the secondary node (SN) for addition data throughput. The data radio bearer (DRB) established on the serving cell of MN has the PDCP anchor point terminated at the MN and such DRB is referred as MCG DRB. The data radio bearer (DRB) established on the serving cell of SN has the PDCP anchor point terminated at the SN and such DRB is referred as SCG DRB. The UE can be configured with a split DRB wherein the PDCP PDUs can be transmitted through the two RLC entities established in the MN and SN for that DRB. The PDCP anchor point of such split DRB can be configured to be terminated either at the MN or SN and it is decided by the MN. If the PDCP termination point of the split DRB is MN then the DRB is referred as MCG Split DRB. If the PDCP termination point of the split DRB is SN then the DRB is referred as SCG Split DRB. For the LTE and NR interworking based on DC i.e. EN-DC mode of operation where the MN is LTE eNB and SN is NR gNB, the MCG DRB can be configured with either LTE PDCP or NR PDCP whereas the split DRB (regardless of the PDCP termination point) and SCG DRB is configured for NR PDCP.

From UE perspective there are only three bearer types i.e. MCG DRB, SCG DRB and Split DRB. The split DRB can either terminate at MN or terminate at SN based on MN decision. In EN-DC, network can configure the split bearer with the following configuration:

Split bearer: NR PDCP container+LTE configurations on RLC, MAC and physical layers+NR configuration container on NR RLC, MAC and physical layers, etc. Split bearer whose PDCP termination point is at MN can be termed as split bearer terminated at MN or MCG split bearer. Split bearer whose PDCP termination point is at SN can be termed as the split bearer terminated at SN or SCG split bearer. These split bearer can be either transparent to the UE or UE is aware of the termination point of split bearer. This is based on number of configured security keys.

There are three options for security keys which are considered for EN-DC (also applicable for NGEN-DC and NE-DC) or MR-DC:

a. Security key per PDCP termination point i.e. 2 security keys: UE uses two set of keys i.e. one for all MCG bearers and MCG-anchored split bearers and another one for all SCG bearers and SCG-anchored split bearers. This is similar to LTE Rel-12 DC. In case of separate security key per network termination point, UE based on security keys can make it out whether the split bearer terminates at MN or terminates at SN. In this case UE will be aware of location of PDCP anchor point i.e. whether split bearer is terminated at MN or SN.

b. Security key per bearer type i.e., 3 security keys. The UE uses different key per bearer type i.e. three separate keys for MCG, SCG and Split bearers. As in this case split bearer terminates at MN or SN can use separate keys from MCG and SCG bearers, so in this option split bearer termination point is transparent to UE.

c. Security key per DRB: In this there will be separate key for each DRB. UE will use separate keys for each bearer which is configured and it is not based on termination point. so the bearers like MCG bearer, MCG split bearer, SCG bearer and SCG split bearer will use separate set of keys. The split bearer termination point is transparent to UE when security key is per DRB configured.

In case of Security key per PDCP termination point (option a), UE based on the indicated security key for the split bearer can make out termination point of split bearer. With security key per bearer type (option b) or Security key per DRB (option c) for the configured split bearer the UE cannot make out termination point of split bearer.

The option b and option c brings additional complexity to handle these bearer type changes as follows:

i. during these bearer type changes keys will always have to be changed;

ii. the key change for these bearer type changes occurs even when the PDCP termination point has not changed (according to security principle key should be changed when PDCP termination point changes);

iii. if keys are changed then MAC reset is needed which can cause the impact on the other bearers also.

When option b and option c is applied then to avoid MAC reset special handling is needed to ensure that the data on other bearer is not impacted. Such special handling brings additional complexity which can be completely avoided if (option a) is applied. Option b and Option c requires MAC reset during MCG to/from MCG split and SCG to/from SCG Split bearer type change even when PDCP termination point is not changed. To avoid MAC reset special handling is required which brings additional complexity. Making the PDCP termination point for split bearer is transparent to the UE when the option b and option c is applied does not really bring benefits for the UE in terms of bearer type change handling or reducing complexity. Option (a) offers the same level of security protection as the option b and c. In EN-DC, NGEN-DC and NE-DC Security key per PDCP termination point i.e. 2 security keys can be supported. In LTE DC, during handover procedure keys refresh will also occur which will impact keys for configured bearers i.e., K-eNB and S-KeNB as a result UE need to reset and re-establish the L2 entities for all the configured bearers to take care of data with old keys and support lossless transition. In EN-DC similar concept is agreed, during handover procedure for MCG bearer, split bearer and SCG bearer, MCG/SCG PDCP/RLC should be re-established and MCG/SCG MAC should be reset. SCG change is a synchronous SCG reconfiguration procedure (i.e. involving RA to the PSCell) including reset/re-establishment of layer 2 and, if SCG DRBs are configured, refresh of security. The procedure is used in a number of different scenarios e.g. SCG establishment, PSCell change, Key refresh, change of DRB type. In this case all DRB associated with L2 entities need to be re-established and reset.

In EN-DC, if bearer type change occurs through handover or SN change, then UE needs to follow the same rule as applicable during handover or SN change for bearer type change as it involves key change, PDCP anchor point change or PDCP version change. SN change is a synchronous SCG reconfiguration procedure including reset/re-establishment of layer 2 and, if SCG DRBs are configured, refresh of security. If Bearer type change happens through handover procedure then MCG bearer, split bearer and SCG bearer, MCG/SCG PDCP/RLC should be re-established and MCG/SCG MAC should be reset. If Bearer type change happens through SN change procedure then SCG PDCP re-established, SCG RLC re-established, SCG MAC is reset.

Bearer Type Change without Mobility Procedure:

Bearer type change through HO or SN change always causes data loss or interruption in services. There are few bearer type change which does not involve change in PDCP termination point or keys or PDCP version. Those bearer type changes can be supported without mobility procedure i.e. HO or SN change procedure. This invention discussed about bearer type change that can occur without mobility and corresponding L2 handling.

Consider the case, if UE is supporting Security key per PDCP termination point i.e. 2 security key then bearer type change between MCG and MCG split bearer or split bearer terminated at MN does not involve any key or PDCP termination point change as shown in FIG. 2a. In this case there is no need of any synchronous reconfiguration procedure as PDCP termination point does not change. This type of bearer change can be supported without mobility as result there will be no impact of data on other bearers. So no interruption in user plane and latency can be reduced.

NW may decide to change the bearer type which can happen due to load condition or signal condition. As an example for bearer type change between MCG to/from MCG split or between MN terminated bearer types or SCG to/from SCG split or between SN terminated bearer types can be done in scenario if NW wants to improve performance through both links or improve reliability by duplication on both links. In this case there is no change in MN or SN node i.e. there is no inter MN or inter SN or intra MN or SN then bearer type change should be possible without mobility. Bearer type change without mobility should only be possible when keys, PDCP version and PDCP termination point does not change. Bearer type change without mobility should only be possible when PDCP version and PDCP termination point does not change. This will help to avoid interruption in user plane services and also there will be no impact on other bearers.

Accordingly embodiments herein provide a method for handling a user plane by a UE configured for a dual connectivity operation in a wireless communication system. The method includes receiving, by the UE, a RRC reconfiguration message including one or more Layer 2 indications and a Layer 2 configuration corresponding to one or more radio bearers from one of a MN and a SN involved in a dual connectivity operation of the UE. Further, the method includes performing, by the UE, one of: reestablishing of a RLC entity and a data recovery procedure for a PDCP entity corresponding to the radio bearer based on the one or more Layer 2 indications and the Layer 2 configuration received in the RRC reconfiguration message, and reestablishing of a RLC entity and reestablishing of a PDCP entity corresponding to the radio bearer based on the one or more Layer 2 indications and the Layer 2 configuration received in the RRC reconfiguration message.

Referring now to the drawings, and more particularly to FIGS. 3-9, there are shown preferred embodiments.

Figure 3:
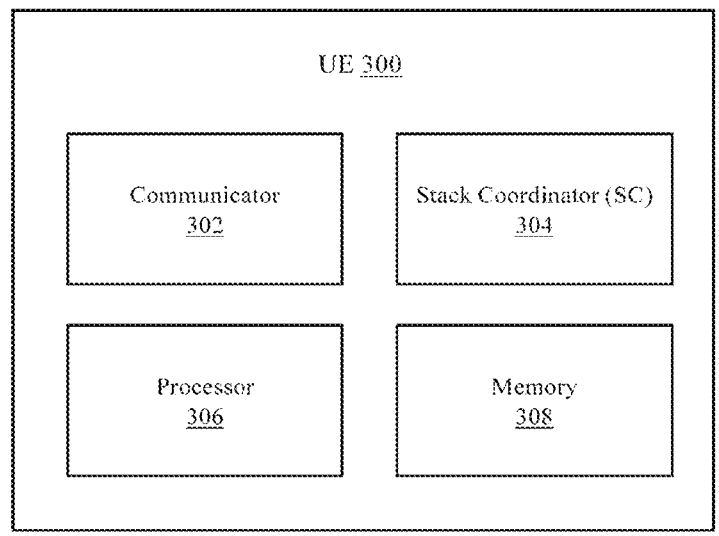
FIG. 3 illustrates various components of a User Equipment (UE) for handling user plane in dual connectivity in a wireless communication system, according to an embodiment as disclosed herein.

FIG. 3 illustrates various components of a User Equipment (UE) for handling user plane in dual connectivity in a wireless communication system, according to an embodiment as disclosed herein. As depicted in the FIG. 3, the UE 300 includes a communicator 302, a stack coordinator (SC) 304, a processor 306 and a memory 308.

The communicator 302 can be configured to transmit or receive radio signals from the Master Node (MN) 100 and the Secondary Node (SN) 200. The communicator 302 includes a RF transceiver module (or dual RF modules), coupled with the antenna, receives RF signals from antenna, converts them to baseband signals and sends them to the processor 306.

The UE 300 includes a 3GPP protocol stack supporting various protocol layers including NAS, AS/RRC, PDCP, RLC, dual MAC, dual PHY if configured for dual connectivity operation, a TCP/IP protocol stack and an application module. The UE 300 with dual connectivity has two MAC entities i.e. one MAC entity associated with the Master Node (MN) and the second MAC entity associated with the Secondary Node (SN). The upper layer stacks (RLC/PDCP) are configured depending on the number of configured radio bearers for the respective MAC entities. At the RRC layer, only one RRC is configured. The RRC controls the protocol stacks corresponding to the MAC entities by communicating with the RRC entity of a serving MN 100. The stack coordinator (SC) 304 can be configured to perform one or more actions on various entities of the protocol In an embodiment, the SC 304 can be configured to receive the RRC reconfiguration message with an indication from the MN 100 or the SN during a SCG change procedure. The indication can be generated by either MN 100 or SN 200 when split bearer is configured and SCG change or bearer type change happens and is exchanged between the MN 100 and the SN 200.

For EN-DC or MR-DC, during the SCG change procedure or bearer type change procedure, the RRC reconfiguration message includes an explicit indication to re-establish the MCG RLC entity of split bearer. Alternatively NR RRC reconfiguration message includes the explicit indication to re-establish the RLC entity for MCG and SCG bearers.

In another embodiment, the SN 200 indicates the LTE about the actions need to be taken for the MCG leg of split bearer and then based on this indication which is received from NR specification i.e. TS 38.331, LTE will take appropriate L2 action on MCG leg of split bearer during SCG change procedure. Existing test proposal in LTE specification i.e., TS 36.331 does not specify such procedures and there is need to define new detailed text proposal which will trigger the action on Legacy L2 entities. As part of this NR stack will indicate the LTE stack to trigger the re-establishment for RLC and MAC reset for specific DRB. On receiving the indication, the LTE stack shall take appropriate actions on specific radio bearer.

In another embodiment, the SC 304 can be configured to receive the RRC reconfiguration message with an indication from the MN 100 or the SN 200 during the bearer type change.

During the bearer type change between split bearer to/from MCG or split bearer to/from split bearer, the UE 300 can take action on SCG leg of split bearer but it cannot take action on L2 entities at LTE side. Thus, there is need of an explicit indication in RRC message which indicate whether LTE RLC re-establishment is needed or not. This will also trigger MAC reset procedure. This explicit indication is generated by either MN or SN node when bearer type change happens. For EN-DC, during bearer type change procedure, LTE RRC reconfiguration or NR RRC reconfiguration message includes the explicit indication to re-establish the MCG and SCG RLC entity for radio bearer.

The indication received in the RRC reconfiguration message includes one or more actions to be performed on a MN RLC entity, a SN RLC entity and a PDCP entity at the UE 300.

The SC 304 can be configured to reestablish the RLC entity at the UE 300 and performs a data recovery procedure for the PDCP entity at the UE 300 based on the indication received in the RRC reconfiguration message.

It should be noted that the bearer type change happens without any mobility event and if a security key is not changed then UE does not involve any PDCP re-establishment procedure. In such scenario, bearer type change procedure is supported by releasing the existing RLC entity and creating new RLC entity without impacting the PDCP entity. Thus, there is need for PDCP data recovery procedure to handle lossless bearer type change due to release of RLC entity which causes the loss of data.

In an embodiment, the PDCP data recovery is performed if the RLC entity is released, however, corresponding PDCP entity is present. Further, the UE 300 performs retransmission of PDCP PDUs of the released RLC entity. The RLC entity is released by discarding one or more PDUs and SDUs. The UE 300 releases the RLC entity for a radio bearer.

In an embodiment, the UE 300 performs retransmission of all the PDCP Data PDUs previously submitted to re-established or released RLC entity in ascending order of the associated COUNT values from the first PDCP Data PDU for which the successful delivery has not been acknowledged by lower layers.

In some embodiments, the RRC reconfiguration message is received with the key indication which includes one or more security keys associated with each bearer for the UE during the bearer type change or during a handover. The key indication indicates the type of security keys to be used for a configured bearer during the bearer type change. Further, the key indication also indicates the UE 300 to use either a master key or a secondary key for the configured bearer.

It should be noted that, with bearer harmonization it is possible that a bearer configured with NR PDCP may be terminating at same PDCP termination point or at different PDCP termination point. The MN 100 or SN 200 can configure the bearer with the same or different set of keys.

Thus, during the bearer type change, the MN 100 or SN 200 transmits the RRC reconfiguration message the key indication to the UE 300 to indicate whether keys for the configured bearer is changed or not. In case, when there is no key indication in the received RRC reconfiguration message, the then UE 300 assumes that there is no change in keys and the UE 300 continues using same key as configured before the bearer type change. It should be noted that the MN or SN indicates a key index per bearer during bearer type change or bearer addition if the MN 100 or the SN 200 intends to change the keys.

Further, the SC 304 is configured to receive the RRC reconfiguration message including one or more Layer 2 indications and Layer 2 configuration corresponding to one or more radio bearers from one of the MN 100 and the SN 200 involved in the dual connectivity operation of the UE 300. Further, the stack coordinator 304 is configured to perform one of: reestablishing of the RLC entity and the data recovery procedure for a PDCP entity corresponding to the radio bearer based on the one or more Layer 2 indications and the Layer 2 configuration received in the RRC reconfiguration message, and reestablishing of the RLC entity and reestablishing of the PDCP entity corresponding to the radio bearer based on the one or more Layer 2 indications and the Layer 2 configuration received in the RRC reconfiguration message.

The processor 306 (for example; a hardware unit, an apparatus, a Central Processing Unit (CPU), a Graphics Processing Unit (GPU), etc.) communicatively coupled to a memory 308 (e.g., a volatile memory and/or a non-volatile memory); the memory 308 includes storage locations configured to be addressable through the processor 306.

The memory 308 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 308 may, in some examples, be considered a non-transitory storage medium. The term "non-transitory" may indicate that the storage medium is not embodied in a carrier wave or a propagated signal. However, the term "non-transitory" should not be interpreted that the memory 308 is non-movable. In some examples, the memory 308 can be configured to store larger amounts of information than the memory. In certain examples, a non-transitory storage medium may store data that can, over time, change (e.g., in Random Access Memory (RAM) or cache).

Figure 4:
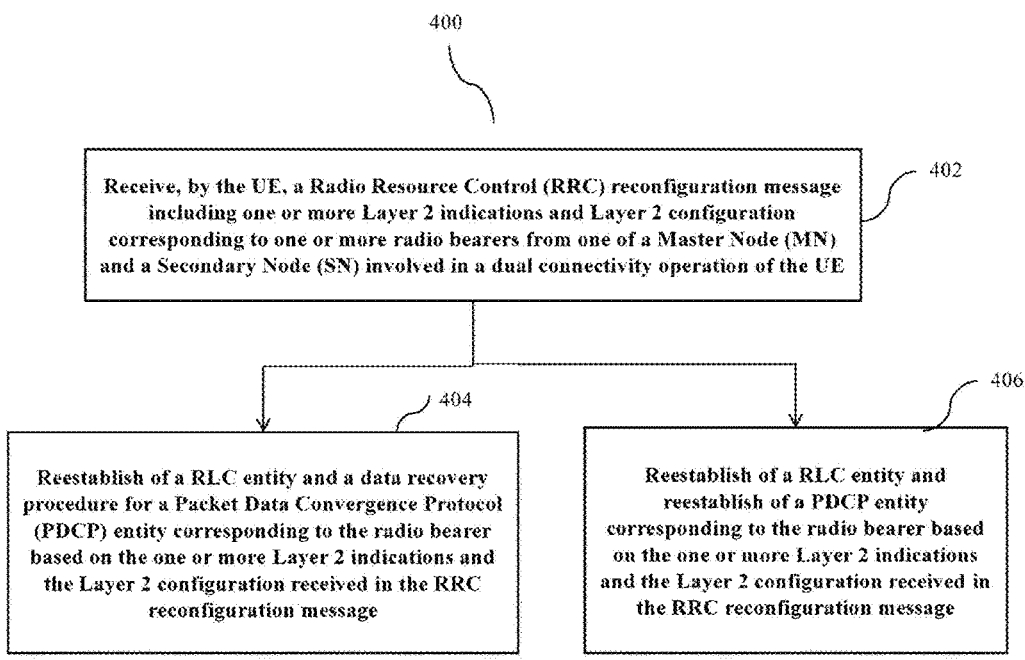
FIG. 4 is a flow diagram illustrating a method for handling a user plane in a dual connectivity by the UE in the wireless communication system, according to an embodiment as disclosed herein.

FIG. 4 is a flow diagram 400 illustrating a method for handling a user plane in dual connectivity by the UE 100 in a wireless communication system, according to an embodiment as disclosed herein. The various steps (i.e., 402-406) of the flow diagram 400 are performed by the stack coordinator (SC) 304.

At 402, the method includes receiving, by the UE 300, the RRC reconfiguration message including one or more Layer 2 indications and Layer 2 configuration corresponding to one or more radio bearers from one of the MN 100 and the SN 200 involved in the dual connectivity operation of the UE 100. At 404, the method includes reestablishing of the RLC entity and the data recovery procedure for the PDCP entity corresponding to the radio bearer based on the one or more Layer 2 indications and the Layer 2 configuration received in the RRC reconfiguration message. At 406, the method includes reestablishing of the RLC entity and reestablishing of the PDCP entity corresponding to the radio bearer based on the one or more Layer 2 indications and the Layer 2 configuration received in the RRC reconfiguration message.

Figure 5:
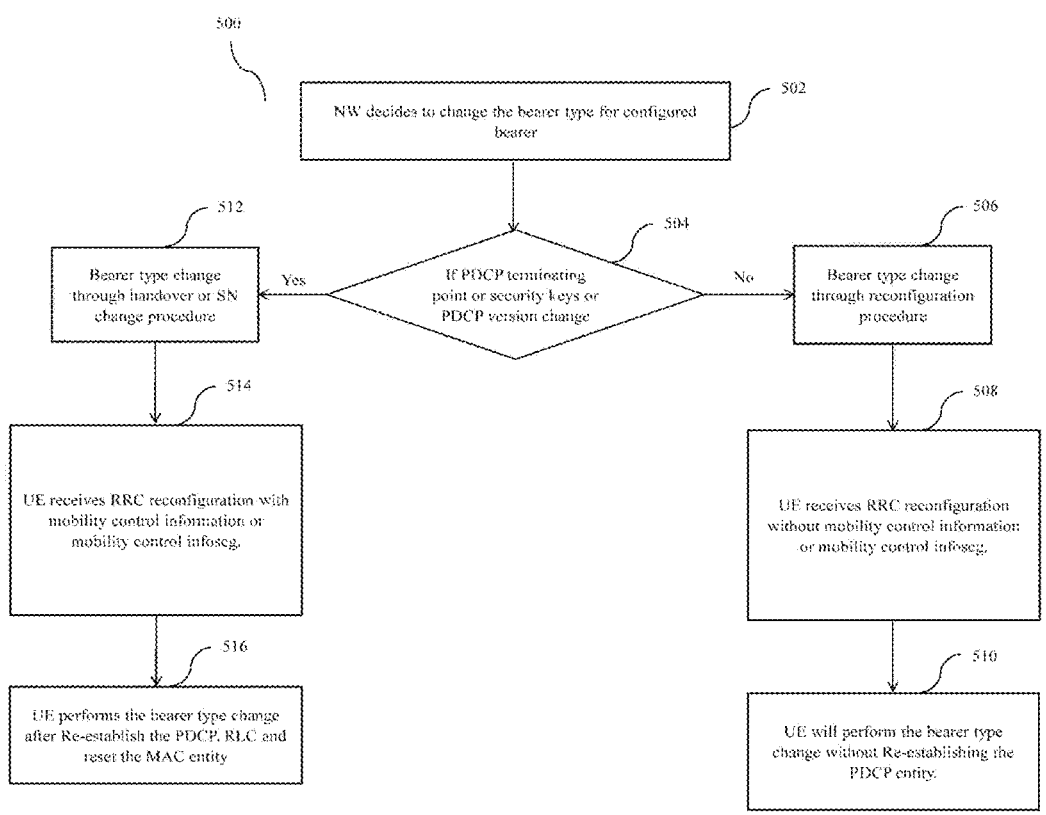
FIG. 5 is a flow diagram illustrating a method for changing the bearer types, according to an embodiment as disclosed herein.

FIG. 5 is a flow diagram 500 illustrating a method for changing the bearer types, according to an embodiment as disclosed herein. At step 502, the NW (i.e., MN 100 or SN 200) decides to change the bearer type for specific bearer. At step 504, the NW determines if there is no change in keys or PDCP termination point or PDCP version change. At step 506, the NW notifies the UE 300 to change the bearer type through reconfiguration procedure without triggering handover procedure i.e., RRC reconfiguration without mobilitycontrolinformation or RRC reconfiguration without reconfigurationWithSync or without triggering SCG change procedure i.e. RRC reconfiguration without mobilitycontrolinfoscg, at step 508. At step 510, the UE 300 may performs bearer type change without impacting the L2 entities i.e., the UE 300 performs bearer type change without PDCP/RLC re-establishment and MAC reset so that data will not be impacted for configured bearer. Alternatively at step 510, the UE 300 performs the bearer type change without Re-establishing the PDCP entity. PDCP, RLC and MAC entity action will depend on indication received in RRC reconfiguration message. If MN or SN node set the re-establish of MN or SN RLC entity or PDCP data recovery indication for MN or SN PDCP entity, then UE will take action on RLC and PDCP accordingly. In case, at step 504, If there is change in change in keys or PDCP termination point or PDCP version change, at step 512, the NW notifies the UE 300 to change the bearer type through reconfiguration procedure through handover or SN change procedure i.e., RRC reconfiguration with mobilitycontrolinformation or mobilitycontrolinfoscg or reconfigurationWithSync, at step 514. At step 516, the UE 300 performs bearer type change with PDCP/RLC re-establishment and MAC reset.

The bearer type change from MCG DRB (NR PDCP configured) to/from MCG Split DRB and SCG DRB to/from SCG Split DRB or bearer type change between MN terminated bearer or bearer type change between SN terminated bearer types does not involve the PDCP anchor point change in the NW. Since the security key is same during these bearer type changes the PDCP is not re-established during these bearer type changes but PDCP recovery procedure may be triggered for the bearer type change from split DRB to MCG/SCG DRB. The security key is not changed since there is no change of the PDCP anchor point it involves transmitting the signaling message including the control information to the UE. The control information does not includes one of the PDCP re-establish indication and the security key change indication in response to the bearer type change in the network for the PDCP entity associated with MCG DRB when reconfigured as MCG split DRB and vice-versa. The control information received in RRC reconfiguration from MN or SN node may contain the re-establish of RLC entity and PDCP data recovery indication to be performed on MN or SN PDCP and RLC entity. Same is case for SCG DRB reconfiguration to SCG Split DRB and vice-versa.

The bearer type change between MCG to/from MCG split bearer or SCG to/from SCG split bearer can happen through Secondary Node Addition procedure or Secondary Node Modification procedure initiated through MN or SN. The Secondary Node Modification procedure may be initiated either by the MeNB or by the SgNB and be used to modify, establish or release bearer contexts, to transfer bearer contexts to and from the SgNB or to modify other properties of the UE context within the same SgNB. The MeNB uses the SN Modification procedure to initiate configuration changes of the SCG within the same SgNB, e.g. the addition, modification or release of SCG bearer(s) and the SCG part of MCG split and SCG split bearer(s). MeNB may not use the procedure to initiate the addition, modification or release of SCG SCells. The SeNB may reject the request, except if it concerns the release of SCG bearer(s) or the SCG part of MCG split bearer(s) and SCG split bearer(s). The SgNB uses the Secondary Node Modification procedure to perform configuration changes of the SCG within the same SgNB, e.g. to trigger the release of SCG SCell(s) (other than PSCell), bearer type change like SCG bearer(s) and the SCG part of MGC split bearer(s) and SCG split bearer(s) (upon which the MeNB may release the bearer or reconfigure it to an MCG bearer), and to trigger PSCell change. The MeNB cannot reject the release request of SCG SCells (other than PSCell), SCG bearer and the SCG part of MCG split bearer and SCG split bearer.

Figure 6:
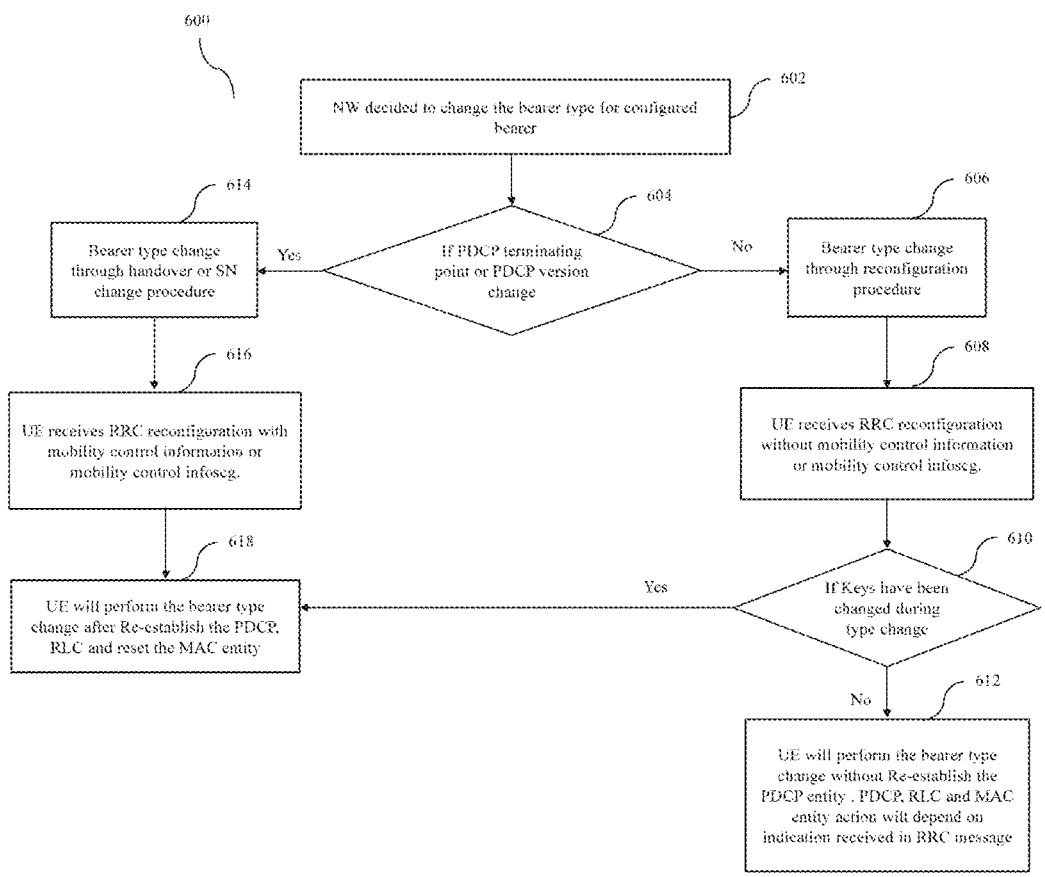
FIG. 6 is a flow diagram illustrating another method for changing the bearer types, according to an embodiment as disclosed herein.

FIG. 6 is a flow diagram 600 illustrating a method for changing the bearer types, according to an embodiment as disclosed herein. At step 602, the NW decide to change the bearer type for specific bearer. At step 604, the NW determines if there is no change in PDCP termination point or PDCP version change. At step 606, the NW notifies the UE 300 to change the bearer type through reconfiguration procedure without triggering handover procedure i.e. RRC reconfiguration without mobilitycontrolinformation or without reconfigurationWithSync or without triggering SCG change procedure i.e. RRC reconfiguration without mobilitycontrolinfoscg at step 608. At step 610, the UE 300 performs bearer type change without impacting the L2 PDCP entity if there is no change in keys, then at step 612, the UE 300 performs bearer type change with or without RLC re-establishment and MAC reset so that data will not be impacted for configured bearer. The re-establishment of RLC entity at the UE 300 will depend upon if NW sends the RRC reconfiguration with RLC re-establishment indicator for MN or SN RLC entity. The NW may also send PDCP data recovery indicator in RRC reconfiguration message to take action on MN or SN PDCP entity. PDCP, RLC and MAC entity action will depend on indication received in RRC reconfiguration message from MN and SN node. If there is change in keys, then at step 618, the UE 300 performs bearer type change with PDCP/RLC re-establishment and MAC reset.

In case, at step 604, if there is change in keys or PDCP termination point or PDCP version change, then at step 614, the NW notifies the UE 300 to change the bearer type through reconfiguration procedure through handover or SN change procedure i.e. RRC reconfiguration with mobilitycontrolinformation or mobilitycontrolinfoscg or reconfigurationWithSync, at step 616. At step 618, UE will perform bearer type change with PDCP/RLC re-establishment and MAC reset.

Figure 7:
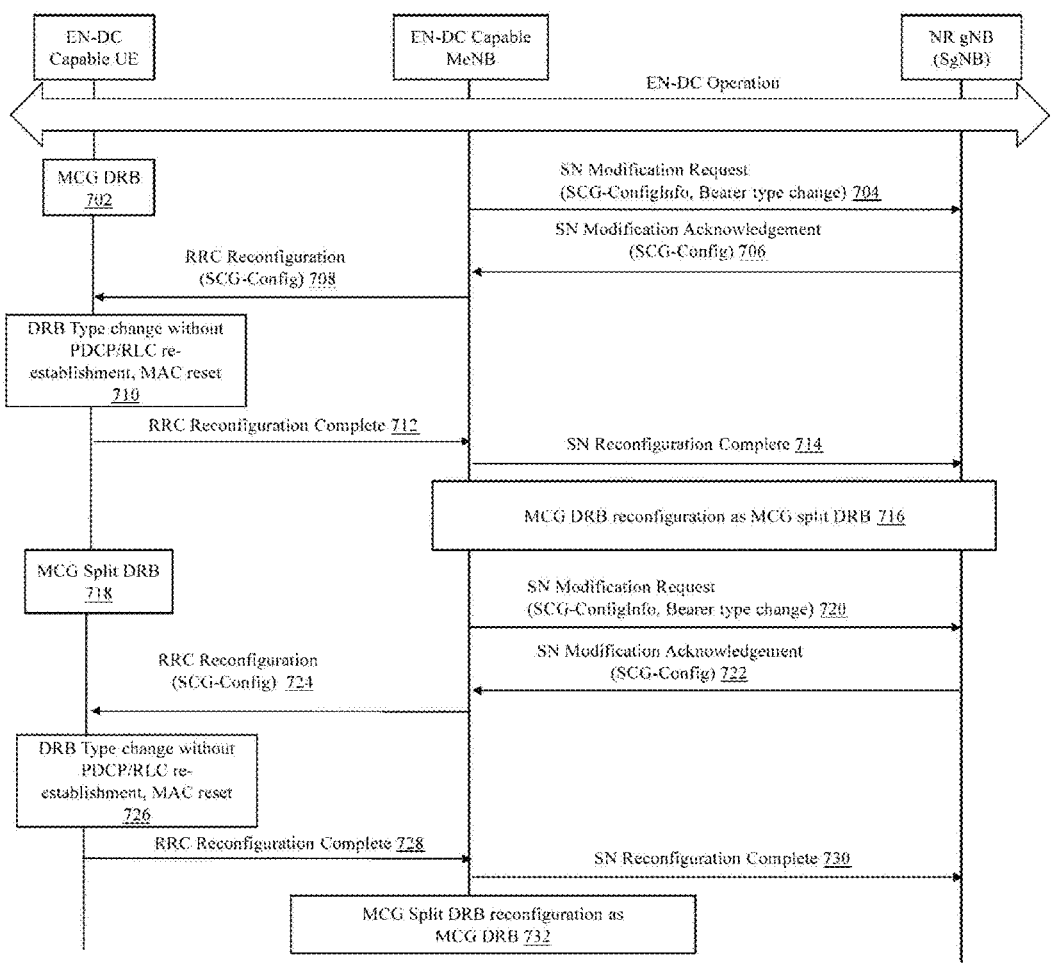
FIG. 7 illustrates sequence diagram illustrating various steps involved during bearer type change between MCG to/from MCG split bearer, according to an embodiment as disclosed herein.

FIG. 7 illustrates sequence diagram illustrating various steps involved during bearer type change between MCG to/from MCG split bearer or MCG bearer to/from split bearer, according to an embodiment as disclosed herein. The same procedure is applicable for MR-DC operation or NR-NR DC operation. The UE 300 is configured with EN-DC operation and initially configured (702) with MCG bearer. The various steps involved in bearer type change is described below:

1. The MeNB sends (704) the SgNB (SN) Modification Request message, which contain bearer context related (bearer type change for MCG to MCG split bearer) and the requested SCG configuration information, including the UE capability coordination result to be used as basis for the reconfiguration by the SgNB.

2. The SgNB responds (706) with the SgNB Modification Request Acknowledge message, which may contain SCG radio resource configuration information within a NR RRC configuration message.

3. The MeNB initiates (708) the RRC connection reconfiguration procedure, including the NR RRC configuration message, This message contains bearer type change information from MCG to MCG split without mobilitycontrolinfo (handover) or mobilitycontrolinfoSCG SCG change) procedure.

4. The UE 310 applies (710) the new configuration and performs bearer type change procedure from MCG to MCG split without impacting the other configured bearers. In this case UE will not re-establish the PDCP/RLC entity of configured bearers and reset the MAC as procedure is initiated without handover and SCG change procedure.

5. The UE performs bearer type change and responds (712) with RRC Connection Reconfiguration Complete, including a NR RRC response message. In case the UE is unable to comply with (part of) the configuration included in the RRCConnectionReconfiguration message, it performs the reconfiguration failure procedure.

6. Upon successful completion of the reconfiguration, the success of the procedure is indicated (714) in the SeNB Reconfiguration Complete message. The UE 300 is reconfigured with MCG split bearer (716) and data transfer (718) is happening through both MN and SN link. In case, the NW wants to convert the MCG split bearer to MCG bearer then this can be either initiated by MeNB or SgNB. The SgNB cannot request to release the last split bearer if that would result in no bearers in SgNB.

7. The MeNB sends (720) the SgNB Modification Request message, which contain bearer context related (bearer type change for MCG to MCG split bearer) and the requested SCG configuration information, including the UE capability coordination result to be used as basis for the reconfiguration by the SgNB.

8. The SgNB responds (722) with the SgNB Modification Request Acknowledge message, which may contain SCG radio resource configuration information within a NR RRC configuration message.

9. The MeNB initiates (724) the RRC connection reconfiguration procedure, including the NR RRC configuration message, This message contains bearer type change information from MCG split to MCG without mobility control info (handover) or mobility control infoSCG (SCG change) procedure. This message also contains PDCP data recovery indication for configured PDCP entity.

10. The UE applies the new configuration and performs (726) bearer type change procedure from MCG split to MCG without impacting the other configured bearers. In this case UE will not re-establish the PDCP/RLC entity of configured bearers and reset the MAC as procedure is initiated without handover and SCG change procedure. As this involves release of SN RLC entity, UE will perform PDCP data recovery as received in step 9.

11. The UE performs bearer type change and responds (728) with RRC Connection Reconfiguration Complete, including a NR RRC response message.

12. Upon successful completion of the reconfiguration, the success of the procedure is indicated (730) in the SeNB Reconfiguration Complete message. Thus, the MCG Split DRB reconfiguration is changed (732) to MCG DRB.

Figure 8:
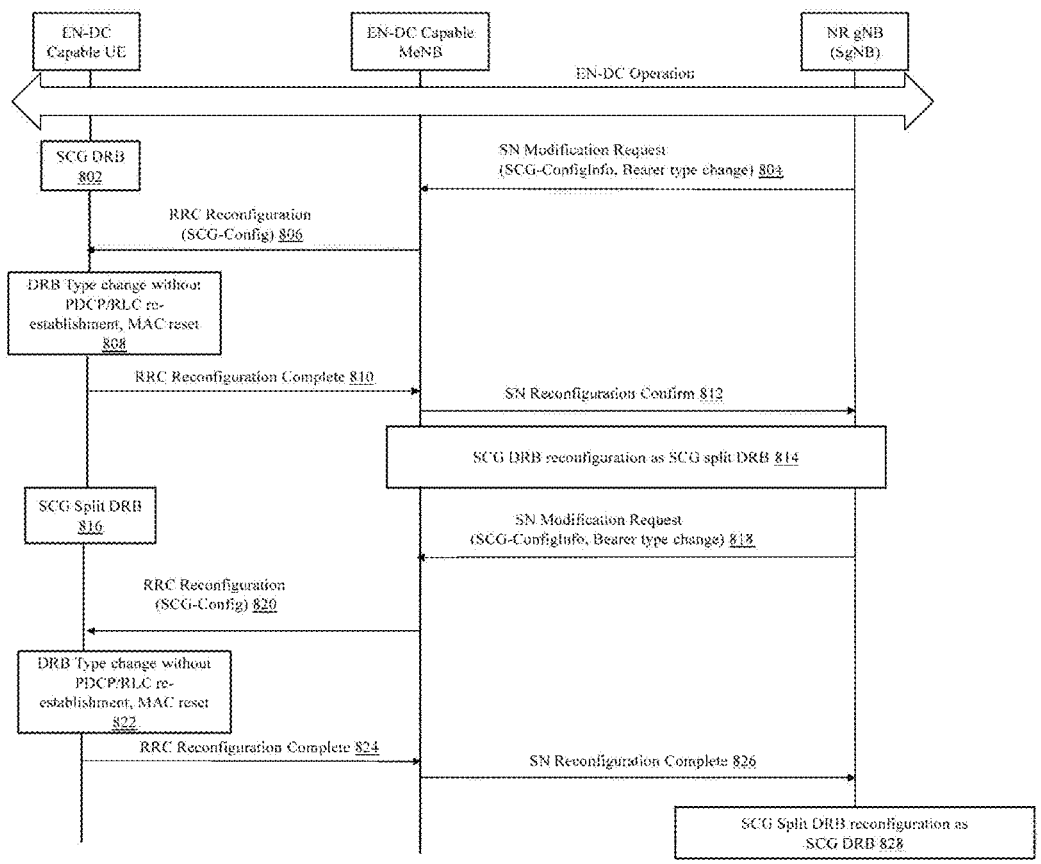
FIG. 8 illustrates sequence diagram illustrating various steps involved during bearer type change between SCG to/from SCG split bearer, according to an embodiment as disclosed herein.

FIG. 8 illustrates sequence diagram illustrating various steps involved during bearer type change between SCG to/from SCG split bearer or SCG bearer to/from split bearer, according to an embodiment as disclosed herein. The same procedure is applicable for other MR-DC operation or NR-NR DC operation. The UE 300 is configured with EN-DC operation and initially configured (802) with SCG bearer. The various steps involved in bearer type change is described below The SgNB sends (804) the SgNB (SN) Modification required message including a NR RRC configuration message, which may contain bearer context related (bearer type change for SCG to SCG split bearer), other UE context related information and the new SCG radio resource configuration.

The MeNB sends (806) the RRCConnectionReconfiguration message including a NR RRC configuration message to the UE including the new SCG radio resource configuration. This message contains bearer type change information from SCG to SCG split without mobility control info (handover) or mobility control info SCG (SCG change) procedure. This message also carries MN DRB info for SCG split bearer. Alternatively this message can also be initiated by SgNB, but in that case MeNB needs to provide SeNB modification confirm to SgNB.

The UE 300 applies the new configuration and performs (808) bearer type change procedure from SCG to SCG split without impacting the other configured bearers. In this case, the UE 300 will not re-establish the PDCP/RLC entity of configured bearers and reset the MAC as procedure is initiated without handover and SCG change procedure.

The UE 300 performs bearer type change and responds (810) with RRC Connection Reconfiguration Complete, including a NR RRC response message. In case the UE is unable to comply with (part of) the configuration included in the RRCConnectionReconfiguration message, it performs the reconfiguration failure procedure.

Upon successful completion of the reconfiguration, the success of the procedure is indicated (812) in the SeNB Reconfiguration Complete message. The SCG DRB is reconfigured (814) as SCG DRB. The UE 300 is reconfigured (816) with SCG split bearer and data transfer is happening through both MN and SN link. In case, NW wants to convert the SCG split bearer to SCG bearer then this can be either initiated by MeNB or SgNB.

The SgNB sends (818) the SgNB Modification Required message including a NR RRC configuration message, which may contain bearer context related (bearer type change for SCG split to SCG bearer), other UE context related information and the new SCG radio resource configuration. The MeNB can also sends the SgNB Modification Request message, which contain bearer context related (bearer type change for SCG split to SCG bearer) and the requested SCG configuration information, including the UE capability coordination result to be used as basis for the reconfiguration by the SgNB.

The MeNB initiates (820) the RRC connection reconfiguration procedure, including the NR RRC configuration message, release of MN DRB for SCG split bearer and PDCP data recover indicator for configured PDCP entity. This message contains bearer type change information from SCG split to SCG without mobility control info(handover) or mobility control info SCG(SCG change) procedure.

The UE 300 applies the new configuration and performs (822) bearer type change procedure from SCG split to SCG without impacting the other configured bearers. In this case, the UE 300 will not re-establish the PDCP/RLC entity of configured bearers and reset the MAC as procedure is initiated without handover and SCG change procedure.

The UE performs bearer type change and responds (824) with RRC Reconfiguration Complete, including a NR RRC response message. In case the UE is unable to comply with (part of) the configuration included in the RRCConnectionReconfiguration message, it performs the reconfiguration failure procedure. Upon successful completion of the reconfiguration, the success of the procedure is indicated (826) in the SeNB Reconfiguration Complete message. Thus, the SCG Split DRB is reconfigured (828) as SCG DRB.

The Bearer type harmonization introduced unified bearer concept. To support Bearer type harmonisation RAN2 has agreed that the same PDCP protocol specification is used for DRBs for MCG split bearer, SCG split bearer and SCG bearer. For MCG bearer, RAN2 agreed either LTE PDCP or NR PDCP can be used as configured by the network.

In LTE-NR interworking it is agreed that network can configure each DRB to use 1 key out of a set of 2 keys (KeNB and S-KeNB derived as specified today). If NR PDCP is configured for MCG bearer then there is possibility that bearer type change between MCG to SCG may not involves key change and PDCP termination point change so there is no need to do PDCP kind of re-establishment procedure. EN-DC operation should support the one step (direct) bearer type change between MCG to/from SCG bearer without PDCP re-establishment kind procedure if NR PDCP is used for MCG bearer.

In LTE-DC bearer type change occurs either through handover (HO) or SN change procedure as a result L2 entities are re-establish and reset for all configured bearers. This is introduced to simplify the bearer type change procedure. Bearer type change through HO or SN change procedure always cause data loss or interruption in services for other configured bearer also as MAC entity is reset during such procedure.

If MCG bearer is configured with NR PDCP then bearer type change between MCG bearer to/from split bearer and MCG to/from SCG bearer does not involve change in PDCP termination point and PDCP version. Moreover it may or may not involve key change as DRB can use any 1 key out of a set of 2 keys. These bearer type changes can be supported without HO or SN change procedure. EN-DC operation should support a single reconfiguration procedure for bearer type change between MCG to/from split bearer and MCG to/from SCG bearer, when MCG bearer is configured with NR PDCP (before and after the bearer type change). EN-DC operation should support the one step (direct) bearer type change between MCG to/from SCG split bearer, SCG to/from MCG split bearer and MCG to/from SCG bearer without HO or SN change procedure. Following assumptions have been made for Table 1 which explains L2 handling MCG and SCG entities during bearer type changes.

(i) In LTE-NR interworking UE support Security key per PDCP termination point i.e. 2 security keys; (ii) In EN-DC, some Bearer type change does not involve change in keys, PDCP version and PDCP termination point; (iii) LTE-NR DC should support the one step bearer type change between MCG bearers to/from split bearer if MCG bearer is configured with NR PDCP.

| FROM | TO | | | | | | | |
|---|---|---|---|---|---|---|---|---|
| | MCG bearer | | MCG split bearer | | SCG bearer | | SGC split bearer | |
| | MCG L2 entity | SCG L2 entity | MCG L2 entity | SCG L2 entity | MCG L2 entity | SCG L2 entity | MCG L2 entity | SCG L2 entity |
| MCG bearer | N/A | | PDCP reordering | RLC establishment | PDCP re-establishment RLC release | Reconfiguration of PDCP with SCG keys, RLC/MAC establishment | PDCP re-establishment RLC re-establishment Reset MAC | Reconfiguration of PDCP with SCG keys, RLC/MAC establishment |
| MCG split-bearer | PDCP data recovery | RLC release | N/A | | Not supported | | FFS | |
| SCG bearer | Reconfiguration of PDCP wth MCG keys, RLC establishment | PDCP re-establishment RLC release | Not suported | | N/A | | RLC establishment | PDCP reordering |
| SCG split bearer | Reconfiguration of PDCP with MCG keys, RLC re-establishment Reset MAC | PDCP re-establishment RLC release | FFS | | RLC release | PDCP data recorvery | N/A | |

In the case of MCG to/from MCG split bearer there is no change in PDCP termination point or PDCP version change or keys change, then NW can support this DRB type change without any mobility procedure. There is no need to re-establish and reset the L2 entities when bearer type change occurs without mobility. During MCG to MCG split bearer, UE should reconfigure the PDCP entity and establish an SCG RLC entity and an SCG DTCH logical channel in accordance with provided configuration.

During MCG split bearer to MCG bearer, SCG RLC entity associated with split bearer will be released, hence if SCG MAC have any data with old keys will automatically get discarded as corresponding logical channel will be released. Since the security key is same during these bearer type changes the PDCP is not re-established during these bearer type changes but PDCP recovery procedure will be triggered for the bearer type change from split DRB to MCG DRB. EN-DC operation should support the one step (direct) bearer type change between MCG to/from MCG split bearer without using the handover procedure.

In the case of SCG to/from SCG split bearer EN-DC operation should support the one step (direct) bearer type change between SCG to/from SCG split bearer without using the handover procedure. During SCG to SCG split bearer, UE should reconfigure the PDCP entity and establish an MCG RLC entity and an MCG DTCH logical channel in accordance with provided configuration.

During SCG split bearer to SCG bearer, MCG RLC entity associated with split bearer will be released, hence if MCG MAC has any data with old keys will automatically get discarded as corresponding logical channel will be released. Since the security key is same during these bearer type changes the PDCP is not re-established during these bearer type changes but PDCP recovery procedure will be triggered for the bearer type change from split DRB to SCG DRB. The EN-DC operation should support the one step (direct) bearer type change between SCG to/from SCG split bearer without using the handover procedure or SN change procedure.

Bearer type change between MCG to/from SCG bearer can also happen through SCG bearer establishment as NW provides SCG counter during initial configuration of SCG security. When NW performs SN addition or modification, it can change the bearer type from MCG to/from SCG. Bearer type change between MCG and SCG involves key change and PDCP termination point change so there is need of PDCP kind of re-establishment procedure for bearer change between MCG and SCG. EN-DC operation should support the one step (direct) bearer type change between MCG to/from SCG bearer with the PDCP re-establishment kind procedure without using the handover procedure or SN change procedure.

Figure 9:
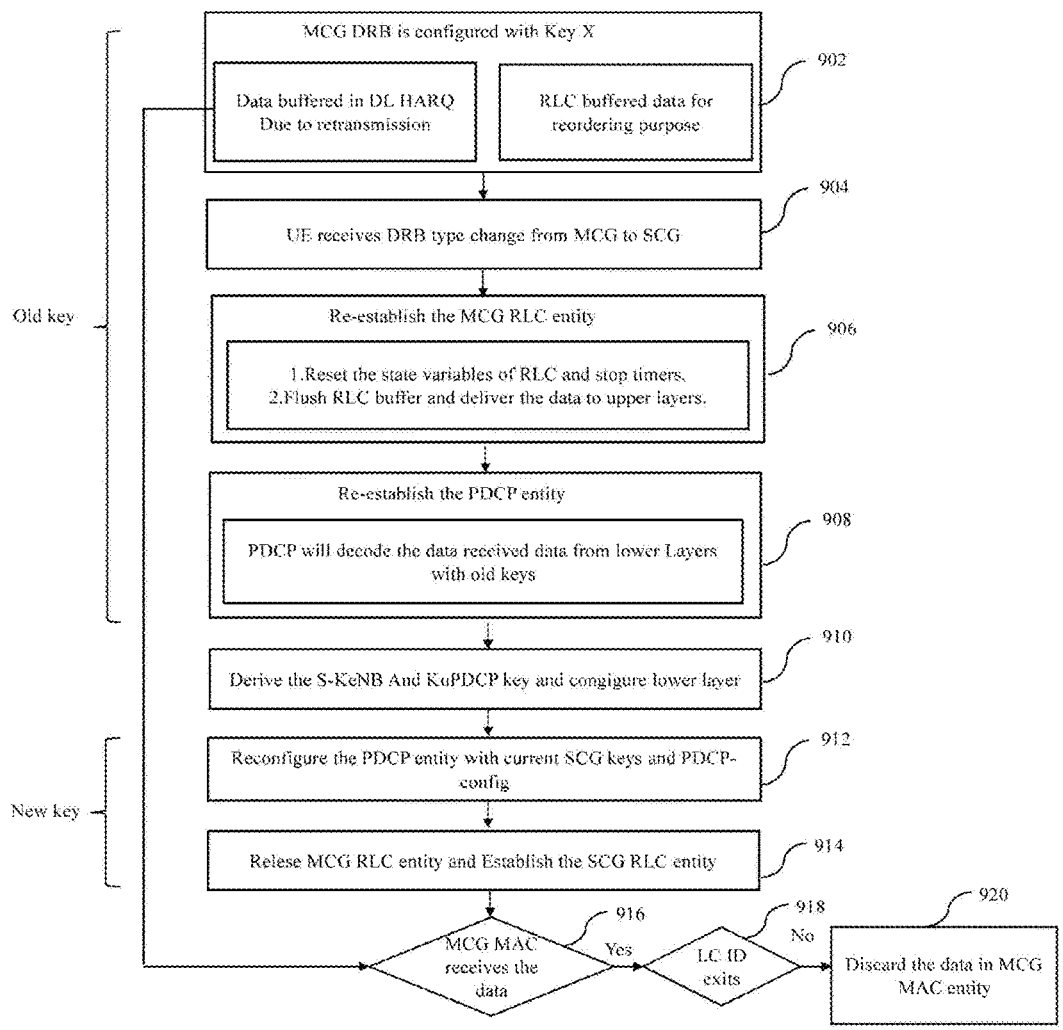
FIG. 9 illustrates a stack behavior during bearer type change between MCG to/from SCG bearer, according to an embodiment as disclosed herein.

FIG. 9 illustrates a stack behavior during bearer type change between MCG to/from SCG, according to an embodiment as disclosed herein. During MCG to/from SCG bearer change there is no need to do MAC reset. In MCG to SCG DRB case when MCG RLC entity is reconfigure with SCG RLC entity then corresponding mapping between MCG RLC entity and MCG MAC will be released and new entity will be created between SCG RLC entity and SCG MAC entity. Once MCG MAC receives the data with old keys it will get discarded at MCG MAC so no need to reset the MCG MAC entity at step 902.

During MCG to SCG bearer change there will be change in RLC version also i.e. from LTE RLC to NR RLC for configured RLC entity. In LTE DC, this is simply done through reconfiguring the MCG RLC entity to SCG RLC entity as there is no change in RLC version, but in EN-DC during MCG to SCG bearer change, RLC entity version will also change from LTE to NR. The UE 300 can do the following. At step 904, the UE 300 receives MCG to/from SCG bearer change to handle RLC entity. At step 906, the UE 300 performs MCG RLC re-establishment, then Release the MCG RLC entity and Establish the SCG RLC entity. This will ensure that UE will share all buffered packets with the PDCP entity; (ii) Release the MCG RLC entity and establish the SCG RLC entity. The UE before releasing MCG RLC entity will ensure that it delivers the SDU to upper layer to avoid loss of data; (iii) MCG RLC re-establishment, Reconfigure the MCG RLC entity to SCG entity with new RLC configuration; (iv) Release the MCG/SCG RLC entity and establish the SCG/MCG RLC entity. This is mainly possible when the NR RLC (SCG to MCG bearer case) is used, NR RLC does not have buffering of a complete RLC SDU and so only a few segments are buffered in RX RLC buffer. Therefore, in this case, it does not need any data recovery procedure and just simple release seems sufficient. Text proposal in 36.300 or 36.331 or 38.300 or 38.331 or 38.xxx can be as below when MCG to SCG DRB type change happens without handover or SN change procedure:

2> if the DRB indicated by drb-Identity is an SCG DRB:
  3> if drb-ToAdd/ModList is received and includes the drb-Identity value, while for this entry drb-TypeChange is included and set to toMCG (i.e. SCG to MCG):
    4> Re-establish the MCG PDCP entity if bearer type change happen without handover or SN change
    4> reconfigure the PDCP entity with the current MCG security configuration and in accordance with the pdcp-Config, if included in drb-ToAddModList;
    4> release the SCG RLC entity and establish the MCG RLC entity
  or
    4> reconfigure the SCG RLC entity or entities and the SCG DTCH logical channel to be an MCG RLC entity or entities and an MCG DTCH logical channel;
    4> reconfigure the MCG RLC entity or entities and/or the MCG DTCH logical channel in accordance with the rlc-Config, logicalChannelIdentity and logicalChannelConfig, if included in drb-ToAddModList;
  3> else (i.e. drb-Type is included and set to scg i.e. MCG to SCG):
    4> Re-establish the MCG PDCP entity if bearer type change happen without handover or SN change
    4> reconfigure the PDCP entity with the current SCG security configuration and in accordance with the pdcp-Config, if included in drb-ToAddModListSCG;
    4> Re-establish the MCG RLC entity and reconfigure the MCG RLC entity or entities and the MCG DTCH logical channel to be an:
SCG RLC entity or entities and an SCG DTCH logical channel;
    4> reconfigure the SCG RLC entity or entities and/or the SCG DTCH logical channel in accordance with the rk-ConfigSCG, logicalChannelIdentitySCG and logicalChannelConfigSCG, if included in drb-ToAddModListSCG;
  Or
    4> release the MCG RLC entity and establish the SCG RLC entity. UE need to deliver the buffered data to upper layers before release.

5.3.x.x DRB Release
The UE shall:
1> for each drb-Identity value included in the drb-ToReleaseList that is part of the current UE configuration (DRB release); or
1> for each drb-identity value that is to be released as the result of full configuration option according to 5.3.5.8:
  2> if this DRB is configured with pdcp-config:
    3> release the PDCP entity;
  2> else (release the RLC bearer configuration of MCG):
    3> re-establish the RLC entity as specified in 36.322 for this DRB;
  2> release the RLC entity or entities;
  2> release the DTCH logical channel;

In case MCG RLC entity is reconfigured to SCG RLC entity as both belongs to different RLC version, then state variable mapping is required between the two RLC entities. The variables used in LTE RLC and NR RLC are different During re-establishment all RLC variables are initialized to zero, so when reconfiguring the LTE RLC entity to NR RLC entity then UE should initialize the all NR state variables with the values as specified during RLC entity establishment in NR The same is true for NR to LTE RLC version change.

In case of MCG to/from SCG split bearer as mentioned in Table 1, when bearer type change occurs between MCG bearers to/from SCG split bearer then it involves key change as well as PDCP termination point change. As a result of this MCG MAC will have data with old set of keys. Due to this, there is need to reset the MCG MAC entity. When the MAC entity is reset it will impact the data on other bearers also. This MAC reset can be avoided if it does not support direct bearer type change between MCG to/from SCG split bearer. This bearer type change can be supported through MCG to SCG change and then SCG to SCG split bearer. All this can be supported without mobility procedure.

In another embodiment, if the UE 300 wants to support direct bearer type change between MCG to/from SCG split bearer then it is to be done with the PDCP re-establishment kind procedure without using the SN change procedure, at step 910. The PDCP is configured with new keys at step 912. In this case, the UE 300 will do MAC reset. To avoid the same when NW is reconfiguring the bearer to SCG split bearer, it can change the logical channel ID for MCG RLC entity and can mapped the earlier MCG LCH ID to SCG LCH ID, so that mapping between MCG RLC entity and MCG MAC is deleted and with old logical channel new mapping is created between SCG RLC entity and SCG MAC entity, at step 914. This way there is no need to reset the MCG MAC entity.

At step 916, the method includes receiving a MAC PDU. At step 918, the method includes identifying the one or more logical channels associated with the MAC PDU is not configured. At step 920, the method includes discarding sub-PDUs in the MAC PDU for the identified invalid values of logical channels and discarding the sub-PDUs not configured for the logical channels associated with the MAC PDU.

Bearer type change with Mobility procedure: Another alternative is to always support bearer type change through mobility procedure. In EN-DC, if bearer type change occurs through handover or SN change, then UE needs to follow the same rule as applicable during handover or SN change for bearer type change as it may involves key change or PDCP anchor point change or PDCP version change. If Bearer type change happens through handover procedure then for MCG bearer, split bearer and SCG bearer, MCG/SCG PDCP/RLC should be re-established and MCG/SCG MAC should be reset. If Bearer type change happens through SN change procedure then SCG PDCP/RLC should be re-established, SCG MAC should be reset.

The bearer type change from MCG DRB to SCG DRB involves the PDCP anchor point in the network for the PDCP entity associated with the MCG DRB to be changed from the MN to the SN. Since the security key used in the SN is different from the security key used in the MN, the change of the PDCP anchor point involves transmitting the signaling message i.e. RRC reconfiguration including the mobility control information to the UE i.e. SCG-Config. So this bearer change should be handled with HO procedure or SN change procedure because PDCP anchor point changes, security key changes, PDCP re-establishment happens. EN-DC operation should support the one step (direct) bearer type change between MCG to/from SCG bearer through handover or SN change procedure. The mobility control information i.e., SCG-Config includes one of the PDCP re-establish indication and the security key change indication in response to the change of the anchor point in the network for the PDCP entity associated with MCG DRB. The UE will perform PDCP re-establishment and RLC re-establishment and release procedure as mentioned above. MAC reset is not required during MCG to/from SCG bearer change but handover or SN change procedure will always cause MCG/SCG MAC reset which will impact the data on all configured bearers. To avoid the same we need to have some indication in RRC message during handover or SN change procedure which indicates not to reset the MAC entity during bearer type change between MCG to/from SCG bearer.

Bearer type change between MCG and SCG split bearer involves key change and PDCP termination point change so there is need of PDCP kind of re-establishment procedure. As mentioned in observation 3, MAC reset is required for bearer type change between MCG to/from SCG split bearer. To avoid the MAC reset, EN-DC operation should not support the one step (direct) bearer type change between MCG to/from SCG split bearer without mobility procedure. It should support two step bearer changes which involves MCG to SCG bearer type change and SCG bearer to SCG split bearer type change. EN-DC operation should support the one step (direct) bearer type change between MCG to/from SCG split bearer through handover or SN change procedure.

Bearer harmonization introduced unified bearer concept in LTE-NR interworking. MCG Split to/from SCG Split bearer type change may not occur in real networks because once the MN decides the location of the PDCP termination point for the split bearer this may not be changed very frequently. This bearer type change can be supported indirectly with two-step change if required for some reason from NW perspective. If the direct change is not supported then it will help to reduce the specification complexity and number of bearer type change options. The EN-DC shall not support the direct type change between MCG split to/from SCG split bearer.

Another aspect is if UE wants to support this change then it can direct type change between MCG split to/from SCG split bearer through handover procedure as it involves change in keys and PDCP termination point. In case three keys concept is used i.e. keys per bearer type, then this transition can be transparent to the UE as there will no change in keys so there will be no impact on UE.

During MCG to/from MCG split bearer or SCG to/from Split bearer if there is change in keys or PDCP termination point then NW should always do this bearer type change through handover procedure only.

Table 2 explains L2 handling MCG and SCG entities during bearer type changes if Different key per bearer type—Three keys is configured in this case split bearer will be transparent to the UE. Possible bearer type changes are listed below

TABLE 2

L2 handling during bearer type change (3 keys)

| | FROM | | | | | |
|---|---|---|---|---|---|---|
| | MCG bearer | | Split bearer | | SGS bearer | |
| TO | MCG entity | SCG entity | MCG entity | SCG entity | MCG entity | SCG entity |
| MCG bearer | N/A | | PDCP/RLC re-establishment Reset MAC | SGC RLC establishment/ MAC(if NC) | PDCP re-establishment RLC release MAC data will automatically discarded | Reconfiguration of PDCP with SCG keys, SGC RLS/ MAC establishment |
| Split bearer | N/A (UE will get MCG keys only during HO. In case we want to support this, NW has to share the MCG keys without HO) | | N/A | | RLC release MAC data will automatically discarded | Enhance the SCG counter PDCP/RLC re-establishment Reset MAC |
| SCG bearer | | | MCG RLS establishment | PDCP/RLC re-establishment Reset MAC | | N/A |

All bearer type change need keys change although PDCP anchor does not change e.g. MCG to split bearer (Terminate at MN) as result PDCP/RLC re-establishment is needed and MAC reset is required. Few bearer type change required new procedure to support transition between bearer types. There is not much gain if we support bearer type change with and without mobility if separate keys are used per bearer as all transition will lead to L2 reset. To simplify procedure HO/SN change procedure is better option when separate keys are used for every bearer type. This procedure will cause data loss at other bearers also during bearer type change. In case we want to support bearer type change without mobility then we need to enhance the existing procedure to avoid SCG/MAC reset. This can be avoided through PDCP control PDU which indicates that when should receiver start decoding with new keys. NW need to provide new security keys in RRC reconfiguration message when split bearer is configured. In case it is UE is configured with Security key per bearer type then UE uses different key per bearer type i.e. three separate keys for MCG, SCG and Split bearers. In this case if both split bearer and SCG bearer keys derived from MN or MCG bearer then scope of SCG counter need to be enhanced and new counter split counter need to be introduced. NW need to ensure that range of both the counters associated with split bearer and SCG bearer should be different.

Bearer type change without Mobility procedure: Following Assumptions have been made for Table 3 and Table 4 which explains L2 handling MCG and SCG entities during bearer type changes.
(i) In LTE-NR interworking network can configure each DRB to use 1 key out of a set of 2 keys (KeNB and S-KeNB derived as specified today) (ii) In EN-DC, some Bearer type change does not involve change in PDCP version and PDCP termination point; (iii) LTE-NR DC should support the one step bearer type change without mobility procedure between MCG bearers to/from split bearer if MCG bearer is configured with NR PDCP or SCG bearers to/from split bearer or MCG to/from SCG bearer; (iv) Bearer type change with key change can happen without mobility procedure.

Due to unified bearer concept there is no point in having MCG split bearer and SCG split bearer, so we would like to merge the same and have only split bearer. Table 3 illustrates the L2 action for bearer type change without key change and Table 4 illustrates the L2 action for bearer type change with key change. The general rules are If there is no key change, then there is no need to re-establish the PDCP, RLC and reset the MAC.

During key change procedure, PDCP will be re-established and configure with new keys.

RLC will only be Re-establish, if there is PDCP re-establishment.

Release of RLC entity will trigger the PDCP data recovery procedure. This is only valid for the case when PDCP is not re-established.

MAC reset is based on NW solution.

During LTE RLC release, RLC reassemble RLC SDUs from the RLC data PDUs that are received out of sequence and deliver them to upper layer

|  |  | To |  |  |  |  |  |
|---|---|---|---|---|---|---|---|
|  |  | MCG bearer | | Split bearer | | SCG bearer | |
| FROM |  | MCG entity | SCG entity | MCG entity | SCG entity | MCG entity | SCG entity |
| MCG bearer |  | N/A | | No Impact | RLC establish MAC (Re)configure | RLC release (Note 1) MAC Reconfigure | PDCP recovery RLC establish MAC (Re)configure |
| Split bearer |  | PDCP recovery | RLC release MAC Reconfigure | N/A | | RLC release (Note 1) MAC Reconfigure | PDCP recovery |
| SCG bearer |  | PDCP recovery RLC establish MAC Reconfigure | RLC release MAC Reconfigure | RLC establish MAC Reconfigure | No impact | N/A | |

Note 1:
RLC reassemble RCL SDUs from the RLC data PDUs that are received out of sequence and deliver them to upper layer when RLC is released. There is need to re-establish RLC entity before RLC release to deliver the PDUs to upper layer.

TABLE 3

Bearer type change without security key change

|  |  | To |  |  |  |  |  |
|---|---|---|---|---|---|---|---|
|  |  | MCG bearer | | Split bearer | | SCG bearer | |
| FROM |  | MCG entity | SCG entity | MCG entity | SCG entity | MCG entity | SCG entity |
| MCG bearer |  | See HO | | PDCP Re-establish and PDCP reconfigure with new keys RLC Re-establish MAC-See Note 2* | RLC establish MAC Reconfigure | RLC release (Note 1) MAC Reconfigure | PDCP Re-establish PDCP reconfigure with new keys RLC establish MAC (Re)configure |
| Split bearer |  | PDCP Re-establish, PDCP reconfigure with new keys RLC Re-establish MAC: See Note 2* | RLC release MAC Reconfigure | See HO | | RLC release (Note 1) MAC Reconfigure | PDCP Re-establish, reconfigure with new keys RLC Re-establish MAC: See Note 2* |

TABLE 3-continued

Bearer type change without security key change

| | | | To | | | |
|---|---|---|---|---|---|---|
| | MCG bearer | | Split bearer | | SCG bearer | |
| FROM | MCG entity | SCG entity | MCG entity | SCG entity | MCG entity | SCG entity |
| SCG bearer | PDCP Re-establish PDCP reconfigure with new keys RLC establish MAC Reconfigure | RLC release MAC Reconfigure | PDCP Re-establish and PDCP reconfigure with new keys RLC establish MAC Reconfigure | RLC Re-establish MAC-See Note 2* | See SN | |

Note 1:
RLC reassemble RLC SDUs from the RLC data PDUs that are received out of sequence and deliver them to upper layer when RLC is released. There is need to re-establish RLC entity before RLC release to deliver the PDUs to upper layer.
Note 2:
MAC behavior depends on the solution selected by the network, e.g. DRB release/addition, scheduling of restriction or LCID change, MAC reset etc.

Table 4: Bearer Type Change with Security Key Change PDCP Version Change:

Bearer type harmonization introduced unified bearer concept and it allows greater deployment flexibility and to reduce the number of Bearer Type change options. As part of this feature the same PDCP protocol specification i.e. NR PDCP is used for DRBs for MCG split bearer, SCG split bearer and SCG bearer. For MCG bearer, either LTE PDCP or NR PDCP can be used as configured by the network. UE capable of supporting EN-DC operation during LTE standalone operation can be connected to LTE eNB which is either a legacy node or a Rel-15 LTE node. As per legacy LTE procedure during standalone operation LTE bearer is always configured with LTE PDCP. During mobility from legacy LTE to Rel-15 LTE, UE can be reconfigure with NR PDCP version, if UE is working in standalone operation. The reason is when EN-DC capable UE moves from LTE standalone operation to EN-DC operation, there is no need to do PDCP version change for the bearer which will minimize the complexity and restriction for bearer type change. This will help to support lossless transition during bearer type change as PDCP version will not change. In case of LTE stand alone the LTE DRB for the EN-DC capable UE can be configured with NR PDCP version. This will help to have consistent UE behavior and lossless Handover procedure without any restriction. When EN-DC capable UE moves from LTE standalone operation to EN-DC operation, the PDCP version change can happen from LTE PDCP to NR PDCP based on the NW decision. If the EN-DC UE is configured with a bearer which is carrying VOIP data then it is more suitable to use the LTE PDCP version of operation. This is because smaller PDCP SN size is used for VOIP packets which seem efficient. Further there is no motivation to change the MCG bearer carrying VOIP packets to any other bearer type. Therefore there is no benefit in changing the PDCP version of MCG bearers carrying VOIP packets during EN-DC operation. During EN-DC operation, the EN-DC capable UE should not undergo PDCP version change for MCG bearer configured with LTE PDCP when VOIP packets are carried by such bearer.

There can be following possible scenarios where PDCP version change can happen between NR PDCP and LTE PDCP for MCG bearer or standalone LTE bearer.

a. Inter RAT handover can cause PDCP version change in below cases
  When EN-DC capable UE moves from legacy LTE to Rel-15 LTE node for EN-DC operation i.e. MCG bearer PDCP version change can happen when such bearer configured with LTE PDCP is not carrying VOIP packets.
  When NGEN-DC capable UE moves between eLTE eNB connected to NextGen Core and NR gNB. In that case PDCP version change will happen
b. PDCP version change during MR-DC operation
  During MR-DC operation, NW can configure the MCG bearer either with LTE PDCP or NR PDCP Based on NW deployment or requirements it can change the PDCP version for MCG bearer between NR PDCP or LTE PDCP. One such case is for bearer type changes, if MCG DRB is configured with NR PDCP, then direct change between the bearer types can be supported without any complexity or restriction. If MCG DRB is configured as LTE PDCP then there can be impact on bearer type change as direct change between the bearer types e.g. MCG to SCG bearer or MCG to/from Split bearer need some additional restriction to support lossless transition.
c. Bearer Type change
  During EN-DC or MR-DC operation bearer type change for below cases can lead to PDCP version change if MCG bearer is configured with LTE PDCP
  MCG to/from MCG Split bearer
  MCG to/from SCG operation
  MCG to/from SCG split bearer
  All the above mentioned scenarios can be supported through handover procedure as it involves PDCP version change and security key change which requires PDCP re-establishment. The scenarios a and b shall be supported through the handover procedure. Once UE moved to EN-DC operation the MCG bearer can be (not carrying VOIP packets) can be configured NR PDCP version through the handover procedure as it involves PDCP version change and security key change which requires PDCP re-establishment. Once a MCG bearer with NR PDCP version is available then scenario c bearer type changes can be supported efficiently with one-step procedure
  LTE PDCP and NR PDCP even though quite similar in terms of functionality, there are still some differences in terms of e.g. supported PDCP SN size, state variables, reordering functionality, PDCP PDU size etc. To support lossless PDCP version change in either direction few restrictions are required to achieve PDCP version change with the PDCP re-establishment procedure which does not result in data loss. In summary the difference between LTE and PDCP is as below shown in Table 3.

TABLE 5

|  | LTE | NR |
|---|---|---|
| PDCP SN Size for SRB | 5 bits | 12 bits |
| PDCP SN Size for DRB | 7/12/15/18 bits | 12/18 bits |
| UP Integrity | Not supported | Supported |
| UL Duplication | Not supported | Supported |
| PDCP Variable | SN | COUNT |
| Maximum SDU | 8188 bytes | Up to jumbo frame (9 KB) |
| T-reordering | Only for split bearer | Always (by configuration) |

For bearer type changes under scenario c, if MCG DRB is configured with NR PDCP, then direct change between the bearer types can be supported without any complexity or restriction. If MCG DRB is configured as LTE PDCP then then there can be impact on bearer type change as direct change between the bearer types e.g. MCG to SCG bearer or MCG to/from Split bearer need some additional restriction to support lossless transition.

EN-DC operation should support the one step (direct) bearer type change between MCG to/from split bearer and MCG to/from SCG bearer, when MCG bearer is configured with NR PDCP.EN-DC operation where MCG bearer is configured with LTE PDCP, then direct bearer type change of such MCG bearer to split bearer or SCG bearer should not be supported.

PDCP version change for MCG bearer from LTE to/from NR PDCP can happen based on NW decision. When NW decides to do PDCP version change for MCG bearer it can trigger the same through handover procedure i.e. RRC reconfiguration message with mobility control info. This PDCP version change may or may not trigger key change but still as there is significant difference between LTE and NR PDCP protocol, there is need to perform PDCP and RLC re-establishment and reset the MAC to flush all the packets with old format. The handover procedure only for PDCP version change for MCG DRB is costly operation as it will impact the all configured bearers. So there is need to do some enhancements so that we can avoid the MAC reset or avoid triggering the RACH procedure so that there is less interruption time for user plane data. Few enhancements that can be proposed are listed below New parameters can be introduced in handover message which ensures that UE should not trigger the RACH procedure during PDCP version change like rach-Skip can be configured. This field indicates whether random access procedure for the target PCell is skipped. If the received RRCConnectionReconfiguration message includes the rach-Skip then configure lower layers to apply the rach-Skip for the target MCG. Another thing is to avoid MAC reset, UE can allocate new logical channel or RLC entity during PDCP version change. This way it ensures that when MAC entity receives the packet with source PDCP version it will discard the same. Another way to avoid the MAC reset is to set the polling bit in PDCP data PDU which provides the indication to the NW that PDCP version change and it can except the packet with new PDU format. PDCP during re-establishment can also send the End marker packet which indicates that the receiver will receive the packets with new PDCP version Another method to change the PDCP version through Reconfiguration message without mobility control info. In this case NW can simply change the PDCP version of MCG bearer through DRB modification procedure or DRB addition or release procedure. In this case once UE found that PDCP version of MCG DRB have been changed through the indication in RRC reconfiguration message or based on presence of NR PDCP container for the configured MCG DRB or SRB, then it will do PDCP and RLC re-establishment and perform the partial MAC reset to flush the data with source version. Alternatively it can also send the PDCP end market packet during PDCP re-establishment, so that MAC reset is not required.

Another method is on getting RRC reconfiguration message for PDCP version change is to perform only PDCP re-establishment procedure. This is new kind of re-establishment procedure say re-establishment type 2. In this case LTE PDCP parameters will be mapped to NR PDCP parameters. As there is no change in LTE RLC and MAC, so these should not get impacted. Once UE completes the PDCP re-establishment procedure which involves mapping and delivering the packets to upper layers, it will send indication to the NW which indicates that now transmitter send the packet with new PDCP version. This can be achieved by sending either end marker packet which indicates that PDCP will send packet with new PDCP version or setting bit in PDCP data PDU or sending new PDCP control PDU. This kind of procedure will not impact the data on other configured bearers and there is no need to perform MAC reset Split bearer handling during Re-establishment procedure: Re-establishment procedure is used for re-establish the RRC connection, which involves the resumption of SRB1 operation, the re-activation of security and the configuration of only the PCell. The connection re-establishment succeeds only if the concerned cell is prepared i.e. has a valid UE context. In case E-UTRAN accepts the re-establishment, SRB 1 operation resumes while the operation of other radio bearers remains suspended. If AS security has not been activated, the UE does not initiate the procedure but instead moves to RRC_IDLE directly. In LTE DC On Reception of the RRCConnectionReestablishment by the UE, re-establish PDCP for SRB1; re-establish RLC for SRB 1 and perform the radio resource configuration procedure in accordance with the received radioResourceConfigDedicated and resume SRB 1.

In EN-DC split SRB concept is introduced which is used for reliability and improving performance. Split SRB can be used for SRB1 as well as SRB2. Consider split SRB (SRB1) is configured and re-establishment procedure has triggered. In this case UE will do the below as per existing procedure:

1. Suspend all RBs except SRB0 "and send the re-establishment command.

2. Once UE receives RRCConnectionReestablishment, it will do below:

a. re-establish PDCP/RLC for SRB 1;

b. Reconfigure the RLC entity and logical channel config for SRB1;

c. Resume the SRB1.

At the end of step 1, UE have suspended the SRB1 split bearer. In step 2a, UE will re-establish the MCG/SCG PDCP entity for Split SRB1. In step 2b, when UE has to reconfigure the RLC entity and logical channel config for SRB1, it does not have configuration for SCG leg of split SRB1 to reconfigure the split SRB1, as a result split SRB1 cannot be resumed at end of step 2c, so response of re-establishment procedure cannot be send. There is need to define the new behaviour to handle the split SRB1 during re-establishment procedure NW can change the change the "drb type" of SRB1 split bearer to SRB1 bearer i.e. remove the SCG leg of split bearer during RRCConnectionReestablishment procedure, Once UE removes the SCG leg of split SRB1 at step 2b, it can simply resume the SRB1 at the end of step 2c and send the response of re-establishment message Alternatively UE can suspend the split SRB functionality of SCG leg during re-establishment procedure and should only resume once scg configuration is activated. Once UE receives the RRCConnectionReestablishment message, it should only resume the MCG leg of split SRB1 and resume the SCG leg of split SRB1, once it receives the SCG configuration in RRC reconfiguration message after re-establishment procedure is completed.

Another method is UE should release the SCG leg of split SRB1 during re-establishment procedure. Once re-establishment procedure is completed, if NW wants to configure the split SRB1, it can do the same by providing new configuration to the UE. The same methods are applicable for SCG SRB and Split SRB2 also as mentioned for split SRB1. UE can either suspend them or release the SCG leg of split SRB and SCG SRB during re-establishment procedure and resume it only once UE receives the configuration for SCG leg of split SRB2 or SCG SRB if suspended. Text proposal in 36.300 or 36.331 or 38.300 or 38.331 or 38.xxx can be as below when Re-establishment procedure is triggered.

5.3.7.2 or 5.xxx Initiation

The UE shall only initiate the procedure either when AS security has been activated or for a NB-IoT UE supporting RRC connection re-establishment for the Control Plane CIoT EPS optimisation. The UE initiates the procedure when one of the following conditions is met:

1> upon detecting radio link failure, in accordance with 5.3.11; or

1> upon handover failure, in accordance with 5.3.5.6; or

1> upon mobility from E-UTRA failure, in accordance with 5.4.3.5; or

1> upon integrity check failure indication from lower layers; or

1> upon an RRC connection reconfiguration failure, in accordance with 5.3.5.5;

Upon initiation of the procedure, the UE shall:

1> stop timer T310, if running;
1> stop timer T312, if running;
*2571> stop timer T313, if running;
1> stop timer T307, if running;
1> start timer T311;
1> stop timer T370, if running;
1> suspend all RBs except SRB0;
1> reset MAC;
2> release the SCG leg of split SRB (1 &2) and SCG SRB if configured,
1> release the MCG SCell(s), if configured, in accordance with 5.3.10.3a;
1> release the entire SCG configuration, if configured, except for the DRB configuration (as configured by drb-ToAddModListSCG);
1> apply the default physical channel configuration as specified in 9.2.4;

Explicit RLC Re-Establishment and PDCP Recovery Indicator:

In LTE-NR interworking, Bearer type harmonization introduced unified bearer concept. To support Bearer type harmonization, same PDCP protocol specification i.e., NR PDCP is used for DRBs for split bearer, MCG bearer and SCG bearer. When MCG bearer is configured with NR PDCP the lower layers is configured with LTE configuration i.e., LTE RLC, MAC and PHY will be configured.

Due to bearer harmonization, bearers using NR PDCP, UE behavior will be captured in NR specification but for LTE lower layers (RLC, LCH), reuse LTE DRB-AddModd structure which is defined in LTE specification. In LTE-NR interworking there are few scenarios like SCG change and bearer type change procedure where explicit indicator are required to perform RLC re-establishment procedure or MAC reset or PDCP data recovery procedure. This is required as there will be impact on both MCG and SCG L2 entities. Due to different RAT i.e. LTE and NR there are few cases which cannot be handled for L2 action if explicit indicators are not provided.

Split bearer handling during SCG change: SCG change can be of two types. a. PDCP termination point changes. In this case, S-KgNB is changed, SCG PDCP and RLC is re-established, SCG MAC is reset and Random access triggered. In this case it is assumed that PSCell changes.

a. PDCP termination point remains same. In this case, PDCP recovery is triggered, RLC is re-established, SCG MAC is reset and Random access triggered. In this case, it is assumed that PSCell changes but without security key change.

Split bearer can be configured with S-KgNB or KeNB depending upon NW configuration. If split bearer is configured with S-KgNB and SN change occurs then SCG PDCP/RLC should be re-established and SCG MAC should be reset. In this case MCG leg of split bearer i.e. LTE RLC and MAC also need to be re-established and reset as it is carrying the data with old set of keys. The SCG side of RLC re-establishment procedure will be trigger based on SCG indication received but as LTE RAT will not be aware as SCG change happen, it would be difficult to perform any action on MCG leg of split bearer. When UE receives the SCG change procedure through NR RRC reconfiguration message it can trigger the action on SCG L2 entities for split bearer and SCG bearer. During SN change procedure for split bearer, the associated MCG LTE RLC entity need to be re-established and MCG MAC entity need to be reset. As LTE will not be aware of SCG change procedure so it needs some indicators either implicit or explicit to determine the action on MCG L2 entities. To handle this there can be three possible ways.

Implicit Indicator: In this option, NR need to inform the LTE about the actions need to be taken for the MCG leg of split bearer and then based on this indication which is received from NR specification i.e. TS 38.331, LTE will take appropriate L2 action on MCG leg of split bearer during SCG change procedure. Existing test proposal in LTE specification i.e. TS 36.331 does not specify such procedures and there is need to define new detailed text proposal which will trigger the action on Legacy L2 entities. As part of this NR stack will indicate the LTE stack to trigger the re-establishment for RLC and MAC reset for specific DRB. On receiving the same, LTE will take appropriate actions on specific radio bearer.

Explicit indicator: In this option, NW should explicitly mention the actions need to be taken on MCG L2 entities i.e. RLC re-establishment and MAC reset required for specific DRB. This is simple procedure and will not introduce any complicated text details. On receiving the same UE will re-establish the RLC entity for specific DRB or SRB and reset the MAC if needed. This explicit indicator will be generated by either MN or SN node when split bearer is configured or SCG change happen and will be exchanged between the nodes. For EN-DC or MR-DC, during SCG change procedure, LTE RRC reconfiguration message should have explicit indicator to re-establish the MCG RLC entity of split bearer. Alternatively NR RRC reconfiguration message should have explicit indicator to re-establish the RLC entity for MCG and SCG bearers.

Another way to solve this problem is NW should always provide delta signaling i.e., RLC config release and add of new RLC config. This way UE need not to perform the RLC re-establishment for MCG leg of split bearer, Alternatively NW can always perform the handover procedure.

If split bearer is configured with keNB and SN change happens then there is no need to re-establish the PDCP entity of split bearer. The UE can simply re-establish the SCG RLC entity and reset the SCG MAC and Trigger the PDCP data recovery procedure as RLC re-establishment occurs without PDCP re-establishment procedure. NW can provide explicit indicator to perform PDCP data recovery procedure in LTE or NR RRC reconfiguration message.

The NW should always handle this through handover procedure if split bearer is configured and SN change need to performed. This will ensure that all configured bearers are re-established and reset.

Text proposal for 36.331 with in section 5.3.10.3 DRB addition/modification can be specified as below. This indicator can be either explicit or implicit as defined above.

5.3.10.3 DRB Addition/Modification

The UE shall:

2> if drb-ToAddModListSCG is not received or does not include the drb-Identity value:

3> if the DRB indicated by drb-Identity is an MCG DRB or Split DRB (reconfigure MCG and EN-DC split DRB during SN change without HO):

4> if the pdcp-Config is included:

5> reconfigure the PDCP entity in accordance with the received pdcp-Config;

4> if MAC reset indicator is set to TRUE:

5> re-establish MCG RLC entity associated with this drb-id;

5> reset MCG MAC;

4> else MAC reset indicator is set to FALSE:

5> re-establish MCG RLC entity associated with this drb-id;

5> if the received logicalChannelIdentity is different from the current UE configuration (LCID Change):

5> do not reset MCG MAC;

Or

2> if drb-ToAddModListSCG is not received or does not include the drb-Identity value:

3> if the DRB indicated by drb-Identity is an MCG DRB or Split DRB (reconfigure MCG and EN-DC split DRB during SN change without HO):

4> if the pdcp-Config is included:

5> reconfigure the PDCP entity in accordance with the received pdcp-Config;

4> if RLC re-establish indicator is set to TRUE:

5> re-establish MCG RLC entity associated with this drb-id;

5> if the received logicalChannelIdentity is different from the current UE configuration (LCID Change):

5> do not reset MCG MAC;

Or

2> if drb-ToAddModListSCG is not received or does not include the drb-Identity value:

3> if the DRB indicated by drb-Identity is an MCG DRB or configured with MCG RLC bearer in EN-DC (reconfigure MCG DRB or split DRB for EN-DC):

4> if the pdcp-Config is included:

5> reconfigure the PDCP entity in accordance with the received pdcp-Config;

4> if the rlc-Config is included:

5> if reestablishRLC is received, re-establish the RLC entity of this DRB;

5> reconfigure the RLC entity or entities in accordance with the received rlc-Config;

Text proposal for 38.331 for Logical channel below 5.3.x.x.x Logical Channel Addition/Modification For each LCH-Config received in a logicalChannel-ToAddModList IE the UE shall:

1> if the UE's current configuration contains a logical channel with the received logicalChannelIdentity:

2> if reestablishRLC is received, re-establish the RLC entity of this DRB as specified in 38.322:

2> reconfigure the RLC entity or entities in accordance with the received rlc-Config;

2> reconfigure the logical channel entity or entities in accordance with the received mac-LogicalChannelConfig;

Both RLC re-establish indicator and PDCP recovery indicator can be set by MN or SN node and send to UE through RRC reconfiguration message during SCG change and bearer type change procedure. The MN or SN can send this information through information element (IE) in RRC reconfiguration message like recover PDCP or PDCP recovery for PDCP recovery indicator. NW nodes can also add IE is "reestablishRLC" in RRC reconfiguration message. These IE can be generated by LTE RAT or NR RAT during BTC procedure or SN change procedure or any other mobility procedure.

Bearer type change: Bearer type change (BTC) can happen without mobility procedure and can happen with and without key change. If BTC happen without key change then there is no impact on L2 entity. In case BTC happen with key change then there will be impact on L2 entities i.e. PDCP/RLC need to be reestablished and MAC need to be reset as mentioned in Table 4 above. NW need to indicate the key per DRB from which UE will come to know whether BTC causes key change or not. NW can provide key index per bearer or DRB. As BTC happens without mobility procedure so UE need to determine the L2 action based on information provided in RRC message. PDCP re-establishment can be either done based on explicit indicator i.e. NW can provide explicit indicator to re-establish the PDCP entity if there is key change or UE can implicitly derive from security keys that if key change happen for bearer during BTC it should re-establish the PDCP. Once NR PDCP is re-established the corresponding NR RLC entity can be re-established and NR MAC can be reset but L2 actions on LTE RLC or LTE MAC cannot be determined as NR and LTE are two different RATs. During BTC between split bearer to/from MCG or split bearer to/from split bearer, the UE can take action on SCG leg of split bearer but it cannot take action on L2 entities at LTE side. There is need of explicit indicator in RRC message which will indicate whether LTE RLC re-establishment is needed or not. This will also trigger MAC reset procedure. This explicit indicator will be generated by either MN or SN node when bearer type change happens. For EN-DC, during bearer type change procedure, LTE RRC reconfiguration or NR RRC reconfiguration message can have explicit indicator to re-establish the MCG and SCG RLC entity for radio bearer.

Alternatively NW can always perform RLC configuration release and add to avoid LTE RLC re-establishment during bearer type change procedure.

The UE can also perform the actions during bearer type change procedure based on implicit indicator between LTE and NR stack.

SCG change indicator: Another alternative is NW should indicate in the LTE RRC message about SCG change indication so that it can take action on MCG leg of split bearer.

Security key index per bearer: In LTE Security key per PDCP termination point i.e. 2 security keys is used. During initial security activation or Handover procedure UE derives the KeNB. This key is based on the KASME key, which is handled by upper layers. In case of DC, a separate KeNB is used for SCG-DRBs (S-KeNB). This key is derived from the key used for the MCG (KeNB) and an SCG counter that is used to ensure freshness. KeNB is applicable for MCG bearer and split bearer (Terminating at MN) and S-KeNB is applicable for SCG bearers. For EN-DC, the network can configure each DRB to use 1 key out of a set of 2 keys (KeNB and S-KeNB derived as specified today). There are two observations with which security keys can be handled in EN-DC once KeNB and S-KeNB is derived at UE. Bearers terminating at same PDCP termination point can be configured to use 1 key out of a set of 2 keys. Bearers terminating at different PDCP termination point can be configured with separate set of keys i.e. Security keys per PDCP termination point.

NW initiates the security mode command procedure to a UE in RRC_CONNECTED when only SRB1 is established, i.e. prior to establishment of SRB2 and/or DRBs. UE on receiving the security mode command will derive the KeNB key. Once initial security activation procedure is completed, NW initiates the establishment of SRB2 and DRBs.

Consider a case UE is configured with MCG bearer and using key KeNB to derive ciphering and integrity security keys. NW wants to add another bearer say split bearer. If PDCP termination point does not change, NW may configure the split bearer to either use same key or new key. In case, split bearer will use same key as configured for MCG bearer, then it will follow the existing LTE baseline procedure to configure the bearer with existing keys.

In case NW wants to configure the new MCG bearer or split bearer with new set of keys, then it needs to indicate the same to the UE while configuring the bearer. There is need to introduce key indicator per bearer if NW wants to configure the bearers terminating at the same PDCP with different set of keys. On receiving this indication UE will determine S-KeNB based on existing LTE mechanism.

Bearer type change in EN-DC operation should be supported without handover or SN change procedure. This bearer type change may or may not involve the key change. The L2 actions like PDCP/RLC re-establishment or MAC reset depends upon whether bearer type change involves key change or not. All bearer type change options are possible with and without key change through RRC reconfiguration procedure i.e. without mobility procedure.

Due to bearer harmonization concept it is possible that bearer configured with NR PDCP may be terminating at same PDCP termination point or at different PDCP termination point. NW can configure the bearer with the same or different set of keys During bearer type change NW need to indicate the UE whether keys for this bearer is change or not. This can be achieved by providing key indicator per DRB configuration in RRC reconfiguration message. In case this parameter is not present then UE will assume that there is no change in keys and it will continue using same key as configured before bearer type change. NW will indicate the key index per bearer during bearer type change or bearer addition if it wants to change the keys. Absence of this field means UE can continue using the existing configured keys.

Text proposal for 36.331 or 38.331 can be specified as below for indicators to take L2 actions and key index per bearer. This will come in RRC reconfiguration message and placement of these IE can be within any structure of RRC reconfiguration for both LTE and NR RRC. One of the way is shown as below.

```
DRB-ToAddMod::= SEQUENCE {
    eps-BearerIdentity                      INTEGER (0..15)
    OPTIONAL,            -- Cond DRB-Setup
    drb-Identity                            DRB-Identity,
    rlcre-establish indicator BOOLEAN                       OPTIONAL,
    recoverPDCP                             ENUMERATED{true}
    Key indicator ENUMERATED {key1, Key2}
    MAC reset indicator BOOLEAN                             OPTIONAL,
        pdcp-Config                         PDCP-Config
        OPTIONAL,            -- Cond PDCP
        rlc-Config                          RLC-Config
        OPTIONAL,            -- Cond SetupM
    LCH-Config::=                           SEQUENCE {
        logicalChannelIdentity              INTEGER (3..10)
            OPTIONAL,        -- Cond DRB-SetupM
        logicalChannelConfig                LogicalChannelConfig
        OPTIONAL,            -- Cond SetupM
    reestablishRLC                          ENUMERATED{true}
    ...,
    [[  drb-TypeChange-r12                  ENUMERATED {toMCG}
        rlc-Config-v1250                    RLC-Config-v1250
    ]],
```

```
    [[  rlc-Config-v1310              RLC-Config-v1310
        drb-TypeLWA-r13               BOOLEAN
        drb-TypeLWIP-r13              ENUMERATED {lwip,
lwip-DL-only,
                                          lwip-UL-only,
eutran}         OPTIONAL      -- Need ON
    ]],
    [[  rlc-Config-v1430              RLC-Config-v1430
        lwip-UL-Aggregation-r14       BOOLEAN
        lwip-DL-Aggregation-r14       BOOLEAN
        lwa-WLAN-AC-r14      ENUMERATED {ac-bk, ac-be, ac-vi,
ac-vo}  OPTIONAL      -- Cond UL-LWA
    ]]
}
```

PDCP Data Recovery procedure: Bearer type change procedure happen without any mobility event and key change does not involve any PDCP re-establishment procedure. In such scenario, bearer type change procedure is supported by releasing the existing RLC entity and creating new RLC entity without impacting the PDCP entity. There is need to introduce PDCP data recovery procedure to handle lossless bearer type change as due to release of RLC entity will cause the loss of data. So PDCP data recovery need to be performed if RLC entity is released but corresponding PDCP entity is still there. BTC which requires this procedure to be triggered is mentioned in Table 4.

Text Proposal for 38.3235.5: Data recovery For AM DRBs, when upper layers request a PDCP data recovery for a radio bearer, the transmitting PDCP entity shall:

if the radio bearer is configured by upper layers to send a PDCP status report in the uplink (statusReportRequired [3]), transmit a PDCP status report as described in subclause 5.4.1;

perform retransmission of all the PDCP Data PDUs previously submitted to re-established or released AM RLC entity in ascending order of the associated COUNT values from the first PDCP Data PDU for which the successful delivery has not been confirmed by lower layers.

After performing the above procedures, the transmitting PDCP entity shall follow the procedures in subclause 5.2.1.

NR RLC release procedure: NR RLC release procedure is required when RLC entity is released by upper layers. During NR release procedure, there is need to discard all pending RLC PDUs and RLC SDUs so that buffers are clear. There is need to introduce new section in 38.322

Text Proposal for 38.322

5.7 RLC entity release

When upper layers request a RLC entity release for a radio bearer, the UE shall:

discard all RLC SDUs, RLC SDU segments and PDUs
release the RLC entity for the radio bearer.

LTE RLC release procedure for EN-DC: Bearer type change procedure can be supported by releasing the existing RLC entity and creating new RLC entity without impacting the PDCP entity as mentioned in Table 4. LTE RLC supports reordering function, so it will buffer the out of sequence packets in RLC entity. To avoid unnecessary retransmission it is required that during LTE RLC release, RLC reassemble RLC SDUs from the RLC data PDUs that are received out of sequence and deliver them to upper layer. There is need to introduce LTE RLC release procedure to avoid unnecessary retransmission.

Text Proposal for 36.322:

5.6 RLC Entity Release

When upper layers request a RLC entity release for a radio bearer, the UE shall:

for UM RLC entity, reassemble RLC SDUs from UMD PDUs with SN<VR(UH), remove RLC headers when doing so and deliver all reassembled RLC SDUs to upper layer in ascending order of the RLC SN, if not delivered before;

for AM RLC entity, reassemble RLC SDUs from any byte segments of AMD PDUs with SN<VR(MR) in the receiving side, remove RLC headers when doing so and deliver all reassembled RLC SDUs to upper layer in ascending order of the RLC SN, if not delivered before;

release the RLC entity for the radio bearer.

MAC PDU discard due to invalid Logical Channel: In LTE, when a MAC entity receives a MAC PDU for the MAC entity's C-RNTI or Semi-Persistent Scheduling C-RNTI, or by the configured downlink assignment, or on SL-SCH, containing reserved or invalid values, the MAC entity shall discard the received PDU. For data received over MCH channel, there is special handling where instead of discarding the complete PDU; UE will only discard the MAC SDU which carries the reserved or invalid values.

For EN-DC, During bearer type change or SCG change procedure it is agreed that if NW provides the solution like DRB release/addition, scheduling of restriction or LCD change, then there is no need to perform MAC reset. Moreover there are few bearer type changes like split to MCG or split to SCG or MCG to/from SCG, in these cases logical channel will be released. Logical channel release or change can remove the mapping between MAC entity and RLC entity so any data ciphered with old security configuration will be carried through old logical channel can be discarded at MAC layer itself. When a MAC entity receives a MAC PDU which contains logical channel ID for which mapping does not exist between MAC and RLC entity, the MAC entity shall discard the received PDU. This discarded MAC PDU may contain the data for SRB or other data PDU which will impact the configured bearers and will cause unnecessary retransmission.

In NR, the change of Logical channel ID or release of Logical channel ID can be more frequent procedure due to bearer type change or SCG change procedure. The discarding of complete MAC PDU can cause latency and unnecessary retransmission. When MAC entity receives the MAC PDU, if it find any sub header which carries reserved or invalid values it should ignore or discards those MAC SDU. It should not discard the complete MAC PDU. This will not impact the other bearers and unnecessary RLC level retransmission can be avoided. MAC entity should only ignore the MAC PDU sub headers containing reserved values and the corresponding MAC SDUs.

Text Proposal for TS38.321
5.13 Handling of Unknown, Unforeseen and Erroneous Protocol Data
When a MAC entity receives a MAC PDU containing reserved or invalid values, the MAC entity shall:
if it is the LCD for the logical channel released by the previous reconfiguration
ignore the MAC PDU sub-headers containing reserved values and the corresponding MAC SDUs;
else
discard the received PDU.
5.13 Handling of Unknown, Unforeseen and Erroneous Protocol Data
When a MAC entity receives a MAC PDU for the MAC entity's C-RNTI or Semi-Persistent Scheduling C-RNTI, or by the configured downlink assignment, containing reserved or invalid values, the MAC entity shall:
ignore the MAC PDU sub-headers containing reserved values and the corresponding MAC SDUs;
Or
When a MAC entity receives a MAC PDU for the MAC entity's C-RNTI or CS-RNTI, or by the configured downlink assignment, containing an LCD value which is not configured, the MAC entity shall discard the received sub-PDU.

Figure 10:
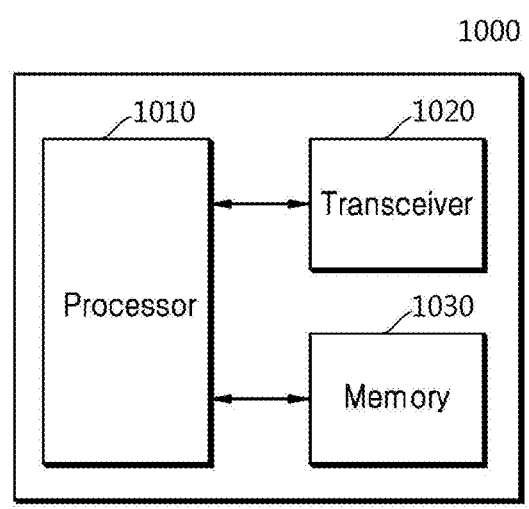
FIG. 10 is a block diagram illustrating the structure of a base station according to another embodiment of the present disclosure.

FIG. 10 is a block diagram illustrating the structure of a device for a base station according to another embodiment of the present disclosure.

Referring to the FIG. 10, the device for the base station 1000 may include a processor 1010, a transceiver 1020 and a memory 1030. However, all of the illustrated components are not essential. The base station 1000 may be implemented by more or less components than those illustrated in FIG. 10. In addition, the processor 1010 and the transceiver 1020 and the memory 1030 may be implemented as a single chip according to another embodiment. The aforementioned components will now be described in detail.

The processor 1010 may include one or more processors or other processing devices that control the proposed function, process, and/or method. Operation of the base station 1000 may be implemented by the processor 1010.

The processor 1010 may determine the locations of transmission resources and reception resources.

The transceiver 1020 may include a RF transmitter for up-converting and amplifying a transmitted signal, and a RF receiver for down-converting a frequency of a received signal. However, according to another embodiment, the transceiver 1020 may be implemented by more or less components than those illustrated in components.

The transceiver 1020 may be connected to the processor 1010 and transmit and/or receive a signal. The signal may include control information and data. In addition, the transceiver 1020 may receive the signal through a wireless channel and output the signal to the processor 1010. The transceiver 1020 may transmit a signal output from the processor 1010 through the wireless channel.

The memory 1030 may store the control information or the data included in a signal obtained by the base station 1000. The memory 1030 may be connected to the processor 1010 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for a user equipment (UE) performing communication with network nodes (NNs) in a wireless communication network, the method comprising:
establishing connections with the NNs and the UE, configured with a new radio access network (NR) evolved-UMTS terrestrial radio access (E-UTRAN) dual connectivity (NE-DC), wherein the UE comprises a plurality of radio link control (RLC) sub-layers including a master node (MN) radio link control (RLC) sub-layer and a secondary node (SN) RLC sub-layer;
identifying at least one radio bearer (RB) identity or logical channel (LCH) identity corresponding to a current configuration of the UE, from one or more Layer 2 indications; and
in response to an indication of re-establishment or release of a RLC sub-layer for the identified RB identity or the identified LCH identity being obtained, performing the re-establishment or the release of the RLC sub-layer for the identified RB identity or the identified LCH identity.

2. The method of claim 1, wherein a split bearer is configured for the RLC sub-layer.

3. The method of claim 1, further comprising:
in response to a data radio bearer (DRB) identity included in the one or more Layer 2 indications not being a part of the current configuration of the UE:
obtaining key indication for the DRB identity based on the one or more Layer 2 indications; and
applying a key, based on the key indication, to a Packet Data Convergence Protocol (PDCP) sub-layer.

4. The method of claim 1, further comprising:
obtaining an indication for recovery of a PDCP sub-layer based on the one or more Layer 2 indications; and
performing retransmission of PDCP protocol data units (PDUs).

5. The method of claim 4, wherein performing retransmission comprises retransmitting the PDUs previously submitted to re-established or released acknowledged mode RLC (AM RLC) sub-layer in ascending order of associated count values from a first PDU for which successful delivery has not been confirmed by lower sub-layers.

6. The method of claim 1, further comprising:
obtaining the indication for the release of the RLC sub-layer; and
performing a discard of RLC service data units (SDUs) and RLC PDUs and the release of the RLC sub-layer.

7. The method of claim 1, further comprising:
in response to a MAC sub-layer receiving a MAC PDU for a MAC sub-layer cell-radio network temporary identifier (C-RNTI) or configured scheduling (CS)-RNTI, discarding a sub-PDU in the received MAC PDU.

8. The method of claim 1, further comprising:
in response to a MAC sub-layer receiving a MAC PDU containing a logical channel identifier (LCID) value that is not configured, via a configured downlink assignment, discarding a sub-PDU in the received MAC PDU.

9. The method of claim 1, wherein a radio resource control (RRC) reconfiguration message comprises a RRC-connectionReconfiguration message triggered based on a bearer type change procedure.

10. A user equipment (UE) for performing communication with network nodes (NNs) in a wireless communication network, the UE comprising:
a transceiver; and
a processor coupled to the transceiver and configured to:
establish connections with the NNs and the UE, configured with a new radio access network (NR) evolved-UMTS terrestrial radio access (E-UTRAN) dual connectivity (NE-DC), wherein the UE comprises a plurality of radio link control (RLC) sub-layers including a master node (MN) radio link control (RLC) sub-layer and a secondary node (SN) RLC sub-layer,
identify at least one radio bearer (RB) identity or logical channel (LCH) identity corresponding to a current configuration of the UE, from one or more Layer 2 indications, and
in response to an indication of re-establishment or release of an RLC sub-layer for the identified RB identity or the identified LCH identity being obtained, perform the re-establishment or the release of the RLC sub-layer for the identified RB identity or the identified LCH identity.

11. The UE of claim 10, wherein a split bearer is configured for the RLC sub-layer.

12. The UE of claim 10, wherein the processor is further configured to: in response to a data radio bearer (DRB) identity included in the one or more Layer 2 indications not being a part of the current configuration of the UE:
obtain key indication for the DRB identity based on the one or more Layer 2 indications, and
apply a key, based on the key indication, to a Packet Data Convergence Protocol (PDCP) sub-layer.

13. The UE of claim 10, wherein the processor is further configured to:
obtaining indication for recovery of a PDCP sub-layer based on the one or more Layer 2 indications; and
performing retransmission of PDCP protocol data units (PDUs).

14. The UE of claim 13, wherein the processor is further configured to:
retransmit the PDUs previously submitted to re-established or released acknowledged mode RLC (AM RLC) sub-layer in ascending order of associated count values from a first PDU for which successful delivery has not been confirmed by lower sub-layers.

15. The UE of claim 10, wherein the processor is further configured to:
obtain the indication for the release of the RLC sub-layer; and
perform a discard of RLC service data units (SDUs) and RLC PDUs and the release of the RLC sub-layer.

16. The UE of claim 10, wherein the processor is further configured to:
in response to a MAC sub-layer receiving a MAC PDU for a MAC sub-layer cell-radio network temporary identifier (C-RNTI) or configured scheduling (CS)-RNTI, discard a sub-PDU in the received MAC PDU.

17. The UE of claim 10, wherein the processor is further configured to:
in response to a MAC sub-layer receiving a MAC PDU containing logical channel identifier (LCID) value that is not configured, via a configured downlink assignment, discard a sub-PDU in the received MAC PDU.

18. The UE of claim 10, wherein a radio resource control (RRC) reconfiguration message comprises a RRCconnectionReconfiguration message triggered based on bearer type change procedure.

19. A method for first network node (NN) performing communication with user equipment (UE) in a wireless communication network, the method comprising:
determining one or more Layer 2 indications including at least one radio bearer (RB) identity or logical channel (LCH) identity; and
transmitting Radio Resource Control (RRC) reconfiguration message including the one or more Layer 2 indications to the UE configured with a new radio access network (NR) evolved-UMTS terrestrial radio access (E-UTRAN) dual connectivity (NE-DC),
wherein the UE comprises a plurality of radio link control (RLC) sub-layers including a master node (MN) radio link control (RLC) sub-layer and a secondary node (SN) RLC sub-layer, and
wherein:
the at least one RB identity or LCH identity corresponding to a current configuration of the UE is identified at the UE, and
in response to an indication of re-establishment or release of an RLC sub-layer, for the identified RB identity or the identified LCH identity being obtained at the UE, the RLC sub-layer for the identified RB identity or the identified LCH identity is re-established or released.

* * * * *